(12) United States Patent
Khalajmehrabadi et al.

(10) Patent No.: US 10,511,392 B2
(45) Date of Patent: Dec. 17, 2019

(54) SYSTEMS, METHODS, AND COMPUTER PROGRAMS FOR WIRELESS LOCAL AREA NETWORK LOCALIZATION

(71) Applicants: Ali Khalajmehrabadi, San Antonio, TX (US); Nikolaos Gatsis, San Antonio, TX (US); David Akopian, San Antonio, TX (US)

(72) Inventors: Ali Khalajmehrabadi, San Antonio, TX (US); Nikolaos Gatsis, San Antonio, TX (US); David Akopian, San Antonio, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 8 days.

(21) Appl. No.: 15/784,287

(22) Filed: Oct. 16, 2017

(65) Prior Publication Data
US 2018/0123708 A1 May 3, 2018

Related U.S. Application Data

(60) Provisional application No. 62/408,665, filed on Oct. 14, 2016.

(51) Int. Cl.
H04B 17/27 (2015.01)
H04B 17/24 (2015.01)
H04B 17/318 (2015.01)
G01S 5/14 (2006.01)
H04W 24/10 (2009.01)
G01S 5/02 (2010.01)
H04B 17/391 (2015.01)
H04W 64/00 (2009.01)
H04W 84/12 (2009.01)

(52) U.S. Cl.
CPC ............ *H04B 17/27* (2015.01); *G01S 5/0252* (2013.01); *G01S 5/14* (2013.01); *H04B 17/24* (2015.01); *H04B 17/318* (2015.01); *H04B 17/391* (2015.01); *H04W 24/10* (2013.01); *H04W 64/00* (2013.01); *H04W 64/003* (2013.01); *H04W 84/12* (2013.01)

(58) Field of Classification Search
CPC ..................................................... H04B 17/27
USPC ...................................................... 455/456.1
See application file for complete search history.

(56) References Cited

U.S. PATENT DOCUMENTS

2012/0149415 A1* 6/2012 Valaee .................. H04W 64/00
455/507

OTHER PUBLICATIONS

Khalajmehrabadi, Ali, et al., "A joint indoor WLAN localization and outlier detection scheme using LASSO and elastic-net optimization techniques." IEEE Transactions on Mobile Computing 16.8 (2017): 2079-2092.

(Continued)

Primary Examiner — Joel Ajayi
(74) Attorney, Agent, or Firm — Thomas Horstemeyer, LLP

(57) ABSTRACT

Disclosed are various embodiments that enable the identification of the location of a computing device based on radio data. A radio map can be identified for an area. The computing device can measure signal strengths to reference points. The signal strengths can be compared to the radio map. The computing device can determine its location based on the comparison of the signal strengths to the radio map.

20 Claims, 24 Drawing Sheets

(56) References Cited

OTHER PUBLICATIONS

Khalajmehrabadi, Ali, et al., "Indoor WLAN localization, Outlier Detection, and Radio Map Interpolation via Group Sparsity." IEEE Transactions on Vehicular Technology (submitted).
Khalajmehrabadi, Ali, et al., "Indoor WLAN localization using Group Sparsity Optimization Technique." Position, Location and Navigation Symposium (PLANS), 2016 IEEE/ION. IEEE, 2016.

* cited by examiner

SYSTEMS, METHODS, AND COMPUTER PROGRAMS FOR WIRELESS LOCAL AREA NETWORK LOCALIZATION

CROSS-REFERENCE TO RELATED APPLICATION

This application claims the benefit of U.S. Provisional Application No. 62/408,665, filed Oct. 14, 2016, the entire contents of which is hereby incorporated herein by reference.

BACKGROUND

Wi-Fi localization is used where GPS and GLONASS are inadequate due to various causes including multipath and signal blockage indoors. The localization system includes indoor positioning systems. Wi-Fi positioning takes advantage of the number of access points available in various areas. The most common and widespread localization technique used for positioning with wireless access points is based on measuring the intensity of the received signals and the method of "fingerprinting." The SSID and MAC address of a WiFi hotspot or wireless access point can be used to geolocate a device. The accuracy of WiFi localization can depend on the number of positions that have been entered into a database. The possible signal fluctuations that may occur can increase errors and inaccuracies in the path of the user.

BRIEF DESCRIPTION OF THE DRAWINGS

For a more complete understanding of the embodiments and the advantages thereof, reference is now made to the following description, in conjunction with the accompanying figures briefly described as follows.

Figure 1:
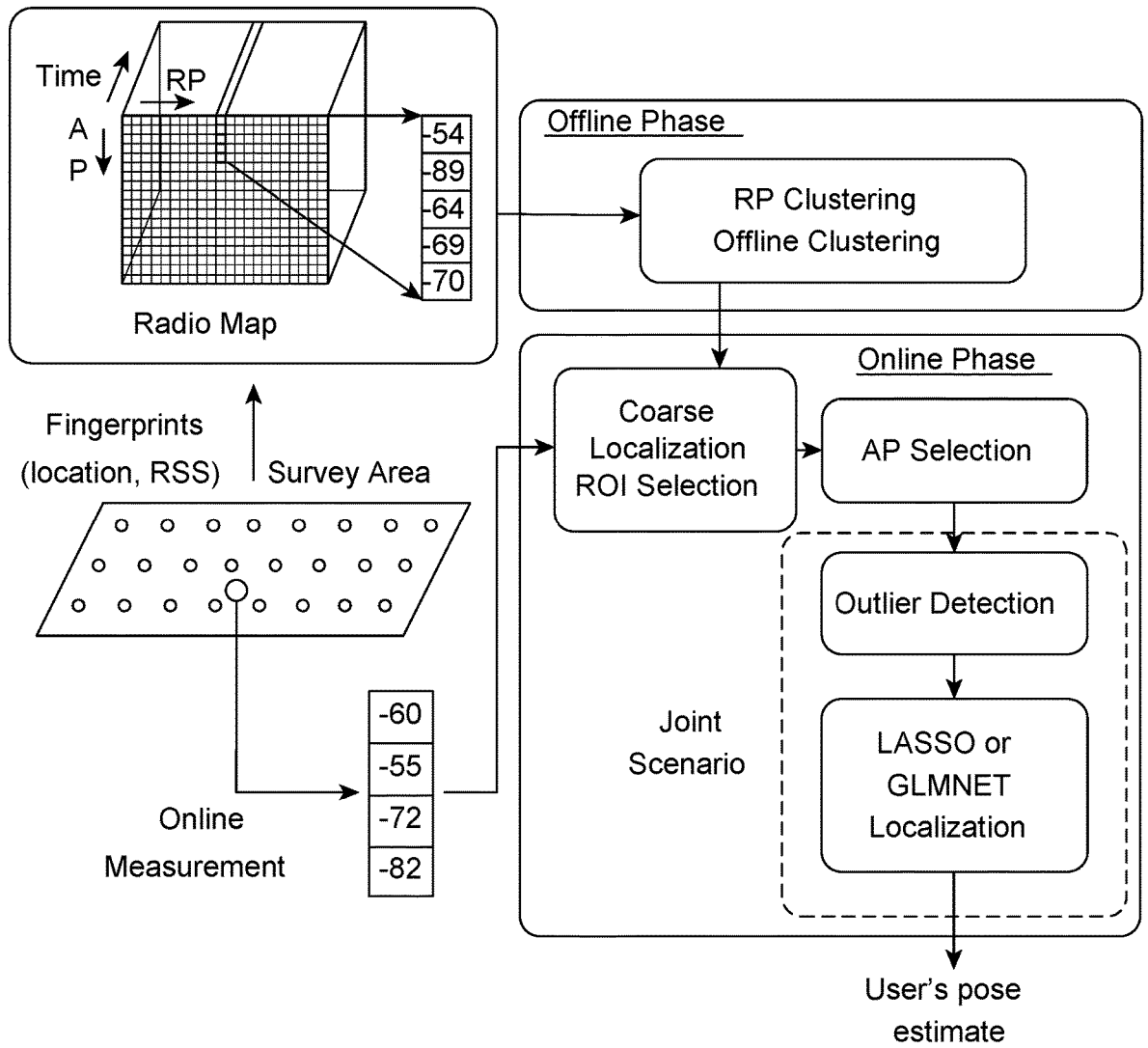
FIG. 1 is a drawing of an example indoor positioning scheme according to various example embodiments.
Figure 2:
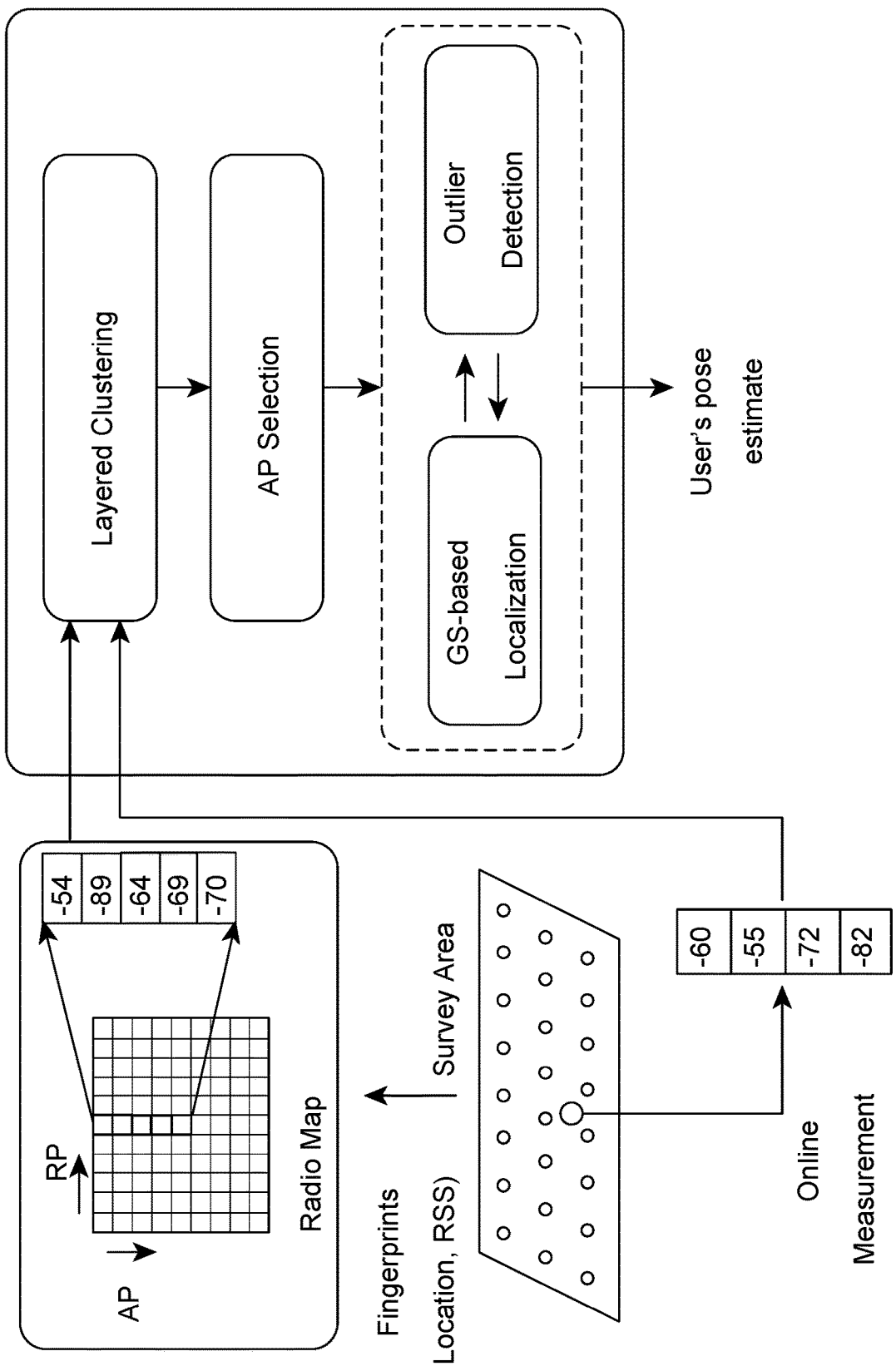
FIG. 2 is a drawing of an example indoor positioning scheme according to various example embodiments.
Figure 3:
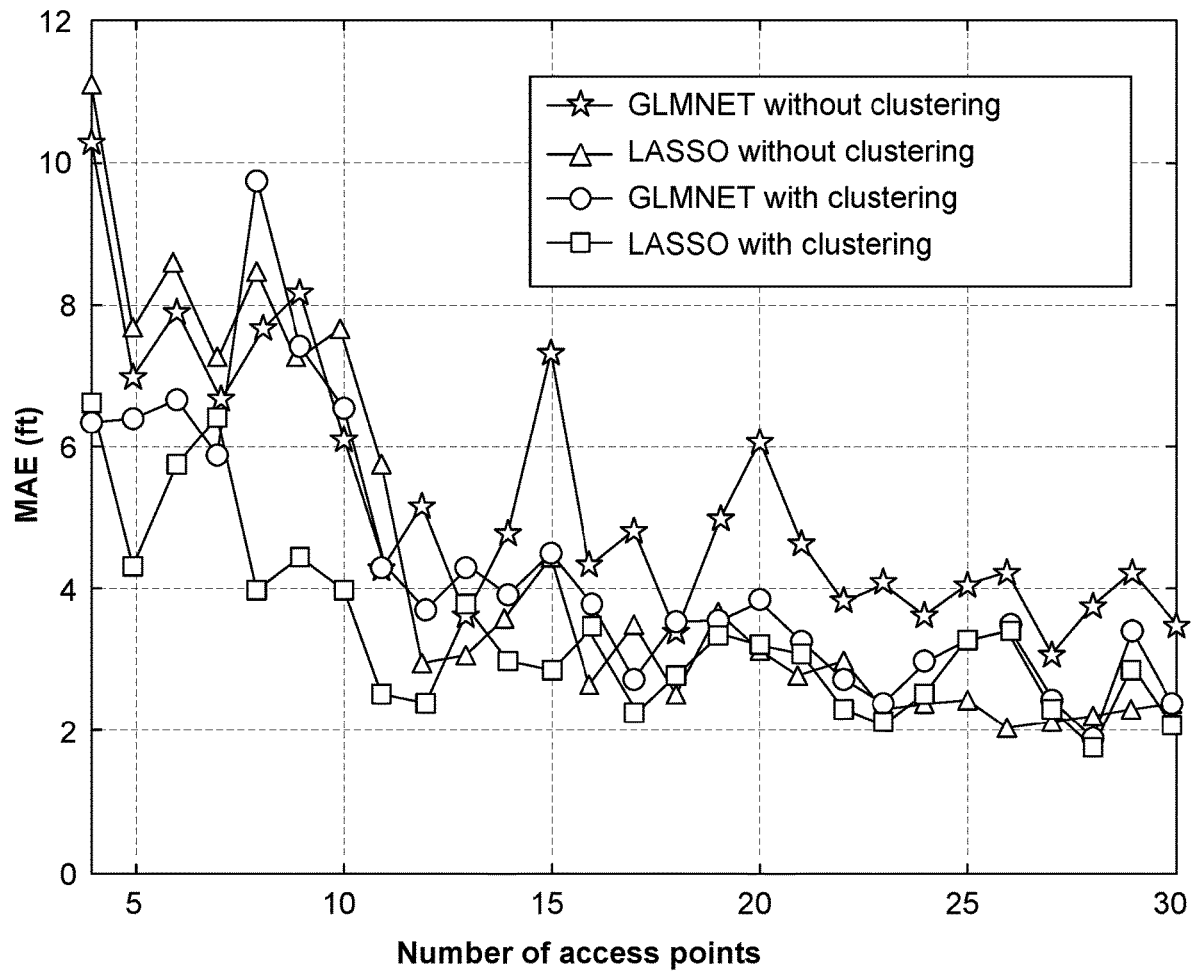
FIG. 3 is a graph of MAE for LASSO and GLMENT localization according to various example embodiments.
Figure 4:
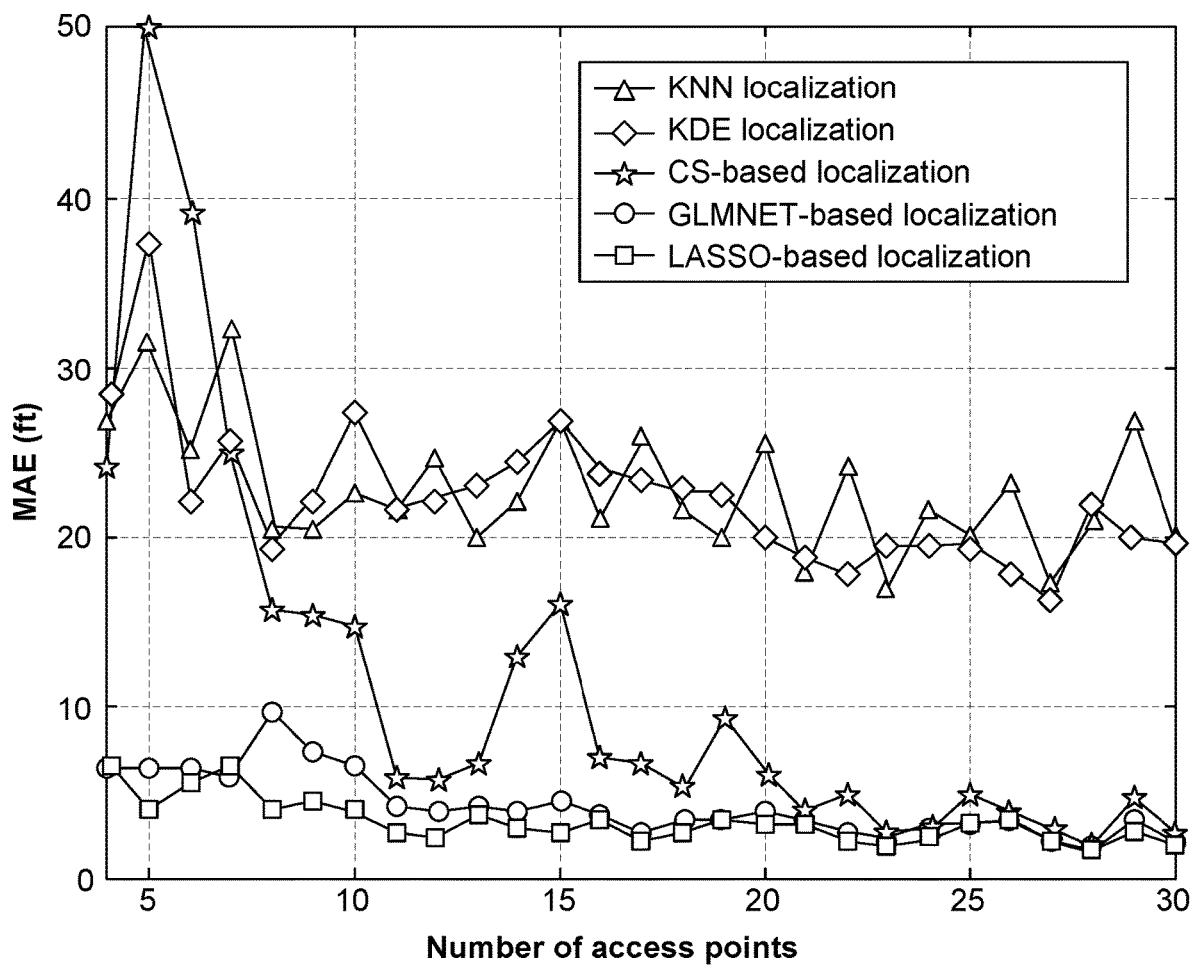
FIG. 4 is a graph of an example of average localization error for KNN, KDE, CSS-based, LASSO-based, and GLMNET-based localization according to various example embodiments.
Figure 5:
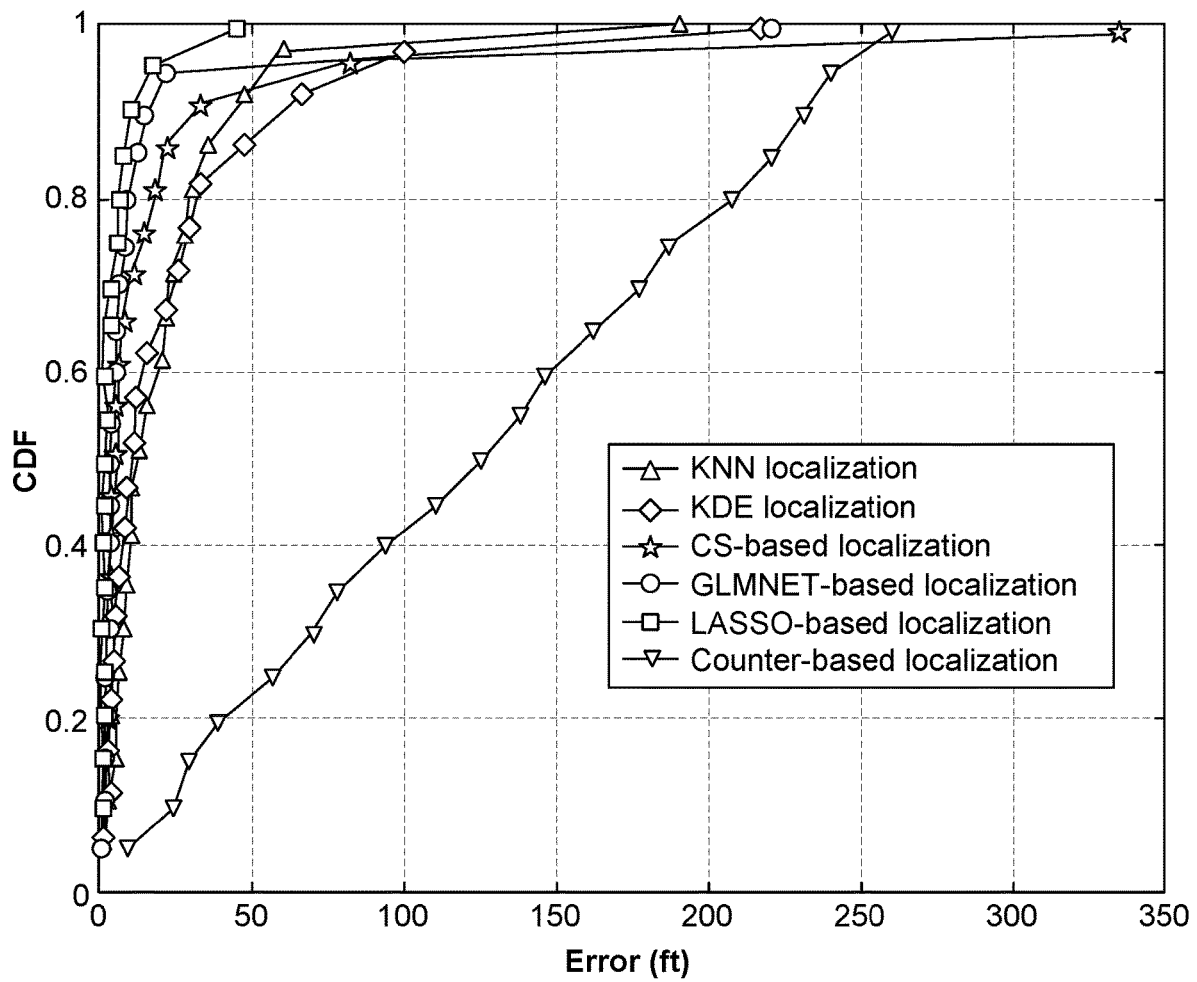
FIG. 5 is a graph of a cumulative position error distribution for KNN, KDE, CS-based, Contour-based, GLMNET, and LASSO-based localization according to various example embodiments.
Figure 6:
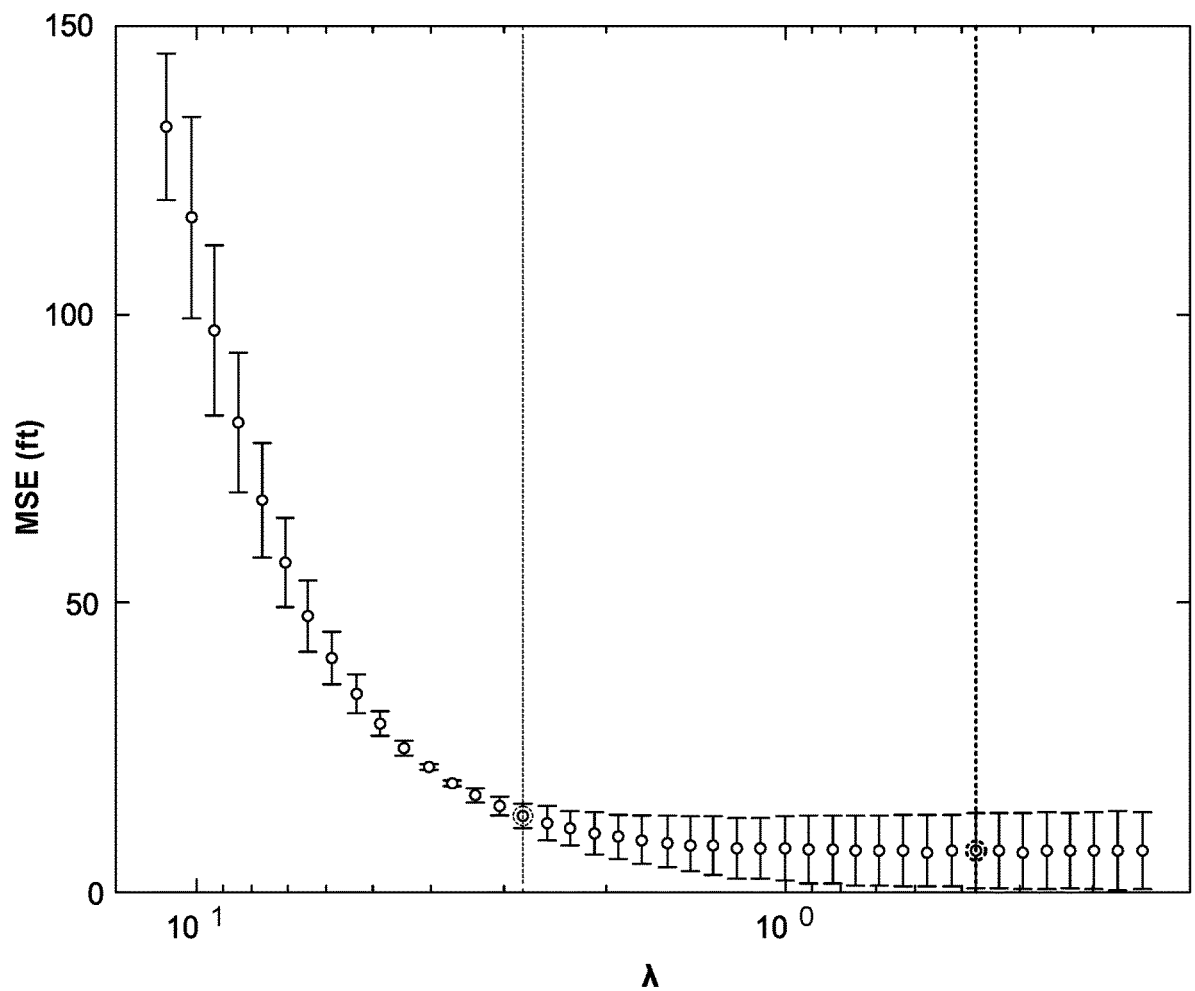
FIG. 6 is a graph illustrating two-fold cross validation for finding A with the minimum MSE for LASSO according to various example embodiments
Figure 7:
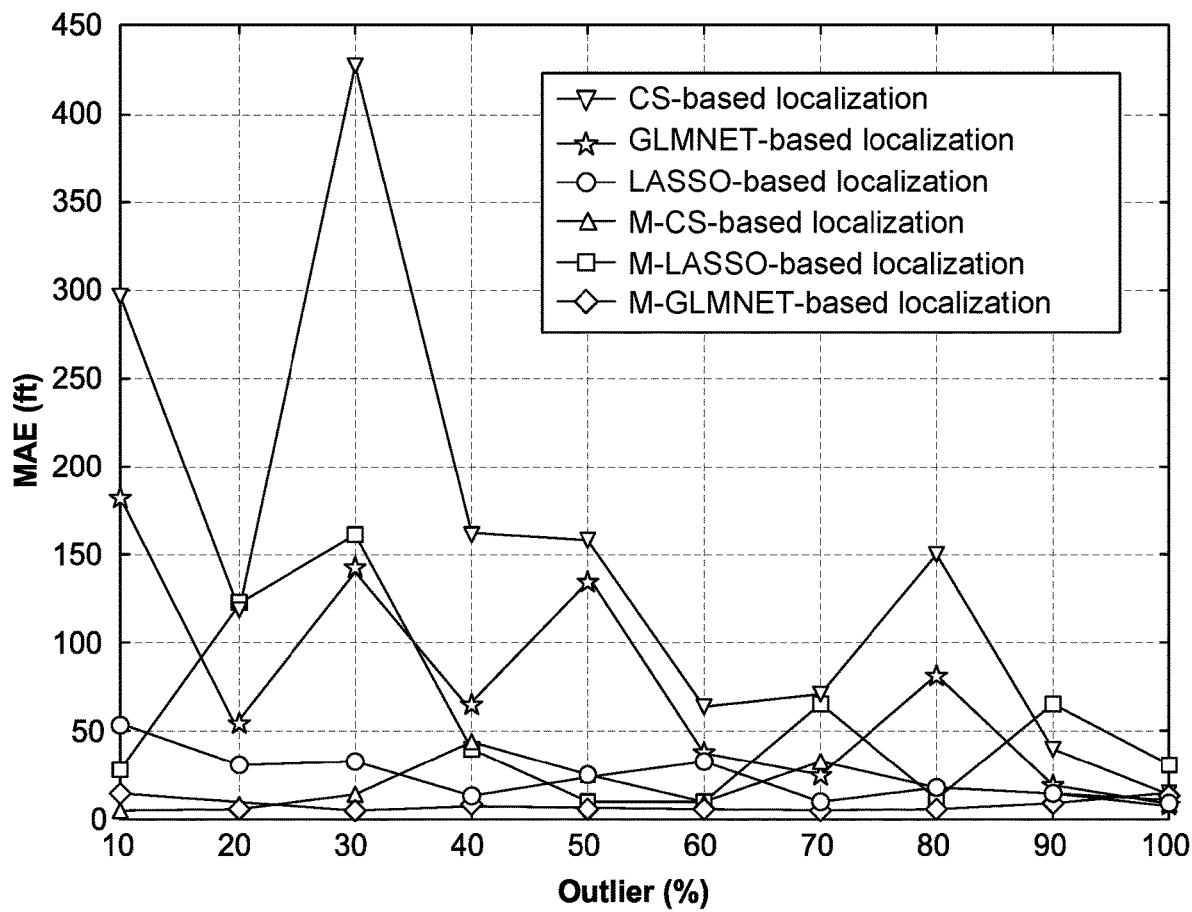
FIG. 7 is a graph illustrating the outlier detection capabilities of according to various example embodiments.
Figure 8:
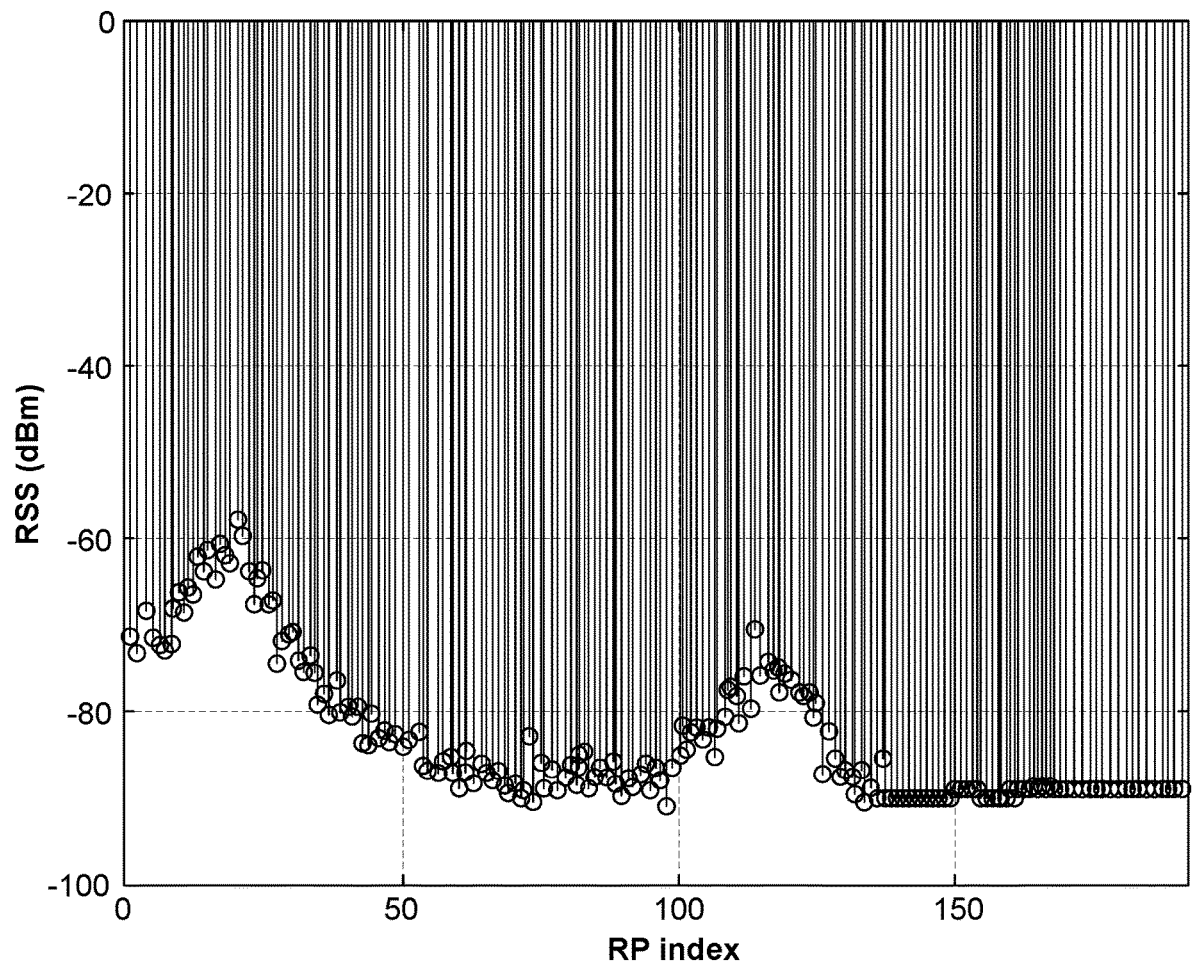
FIG. 8 is a graph illustrating an RSS profile of a single AP according to various example embodiments.
Figure 9:
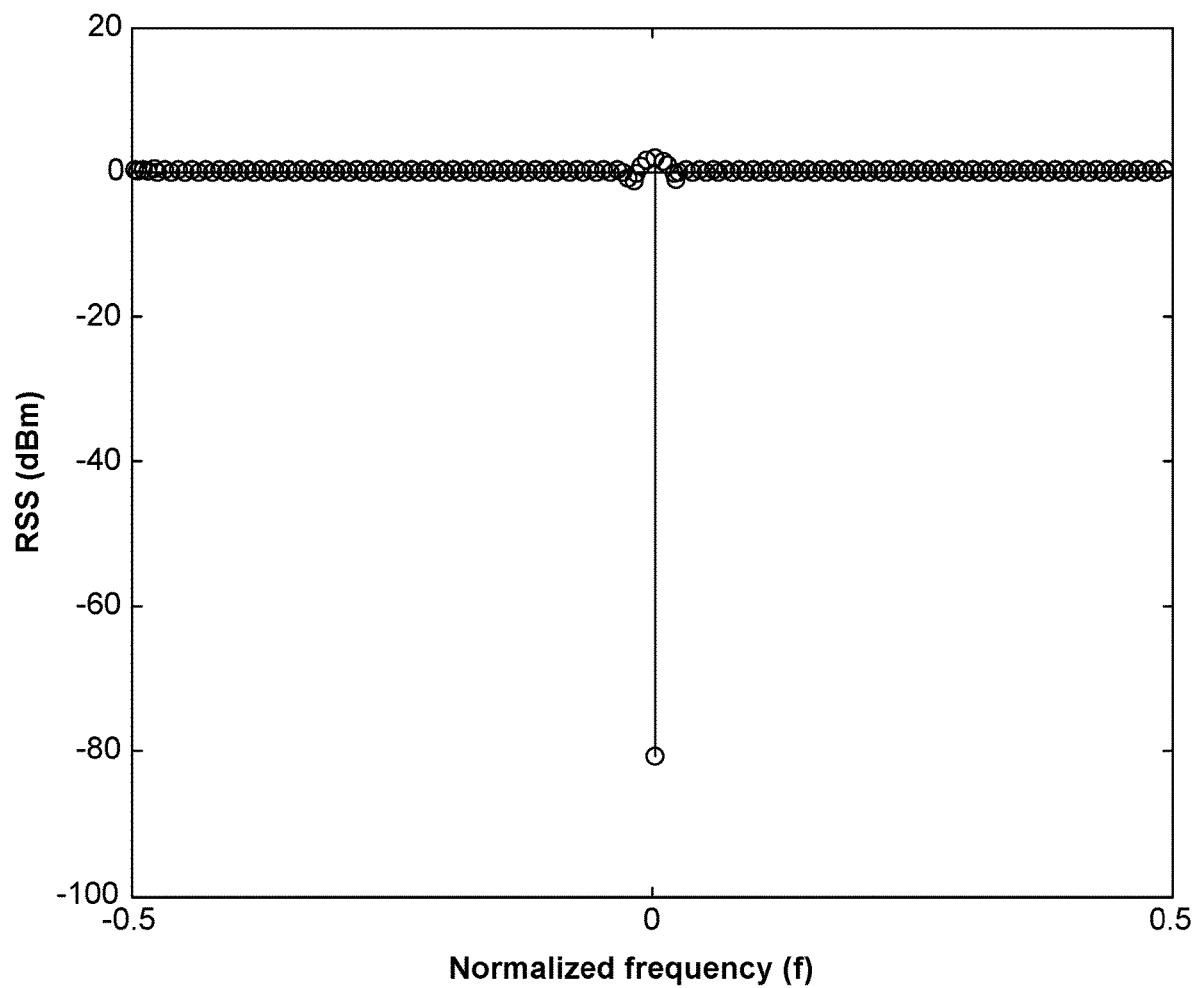
FIG. 9 is a graph illustrating a frequency representation of RSS fingerprints from an AP according to various example embodiments.
Figure 10:
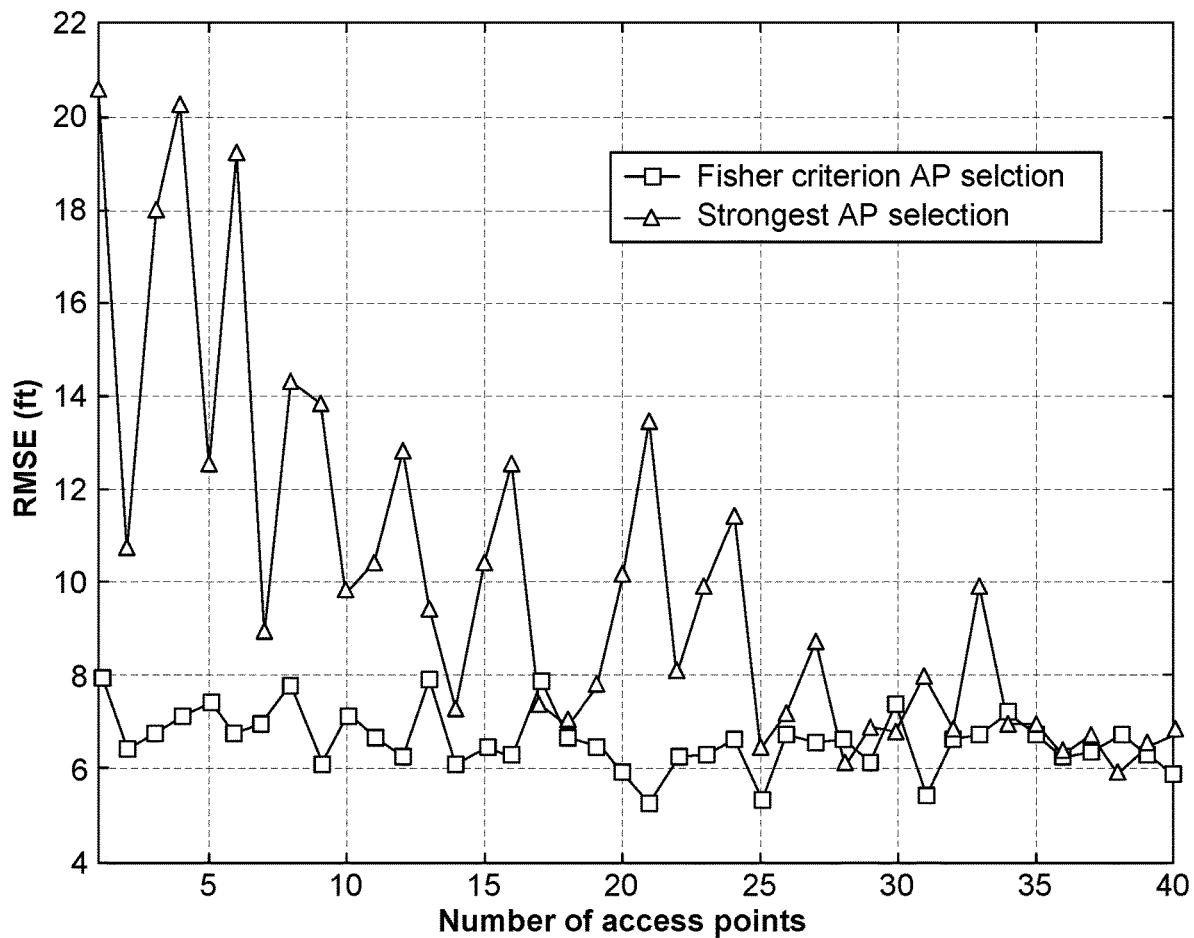
FIG. 10 is a graph of MAE for GS-based localization according to various example embodiments.
Figure 11:
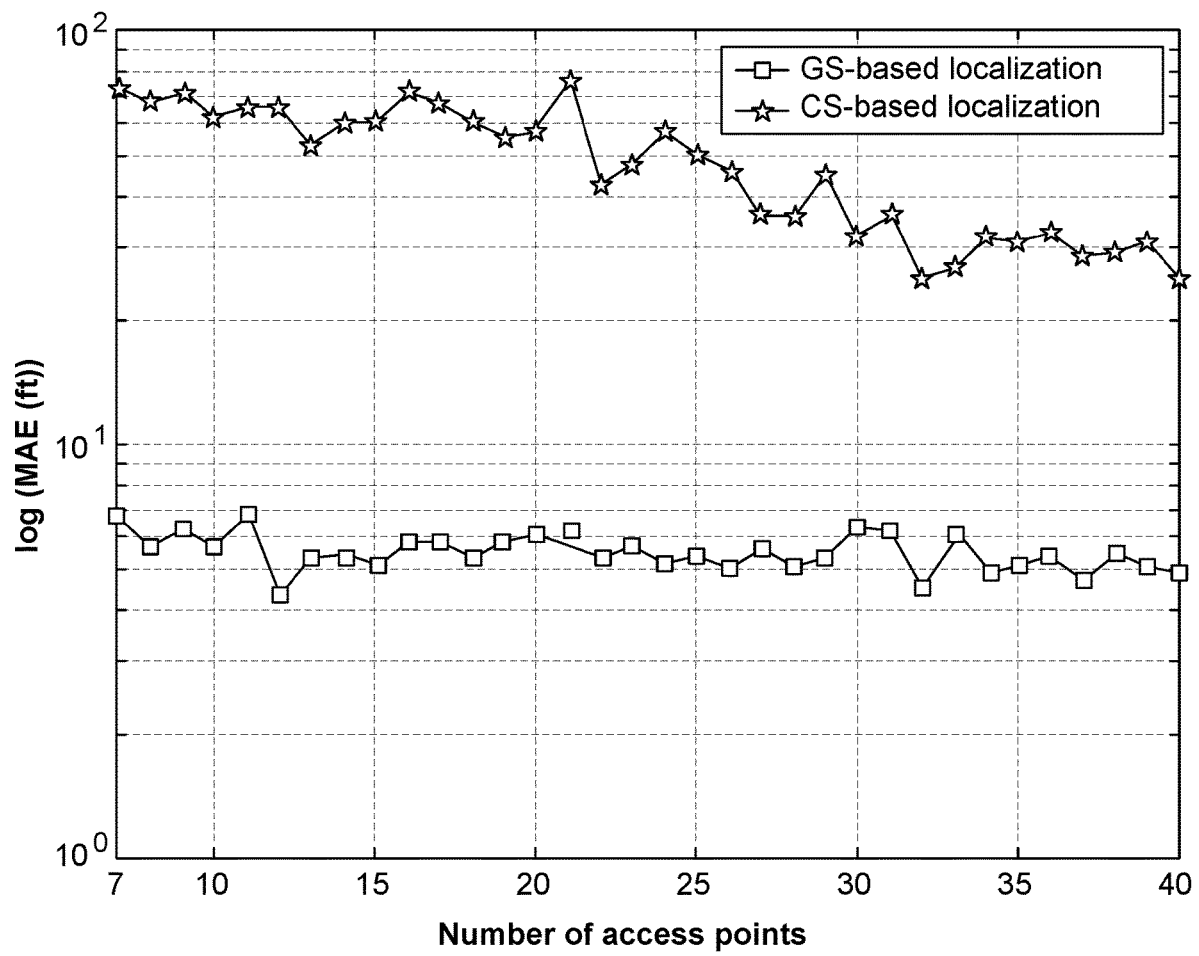
FIG. 11 is a graph of MOE for GS and CS-based localization illustrating according to various example embodiments.
Figure 12:
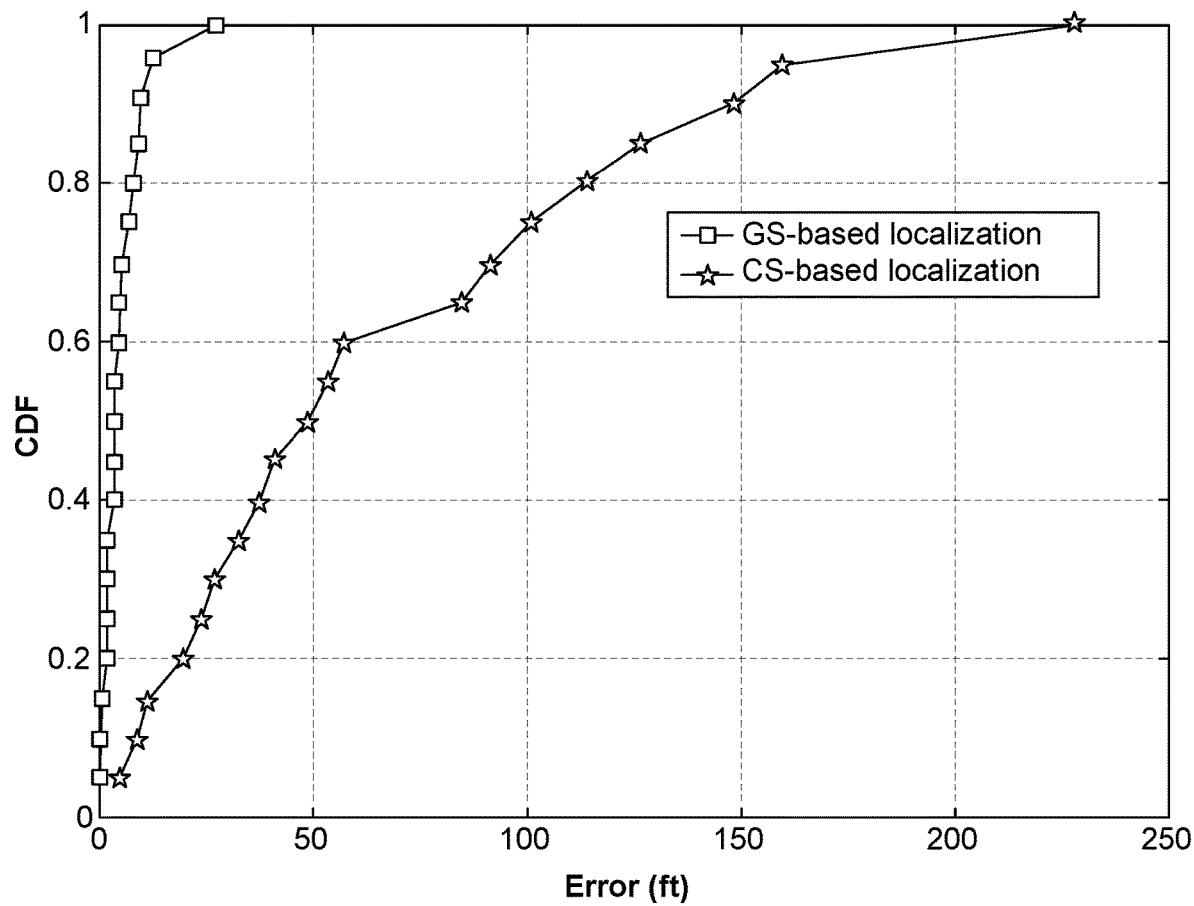
FIG. 12 is a graph illustrating cumulative position error for GS and CS-based localization according to various example embodiments.
Figure 13:
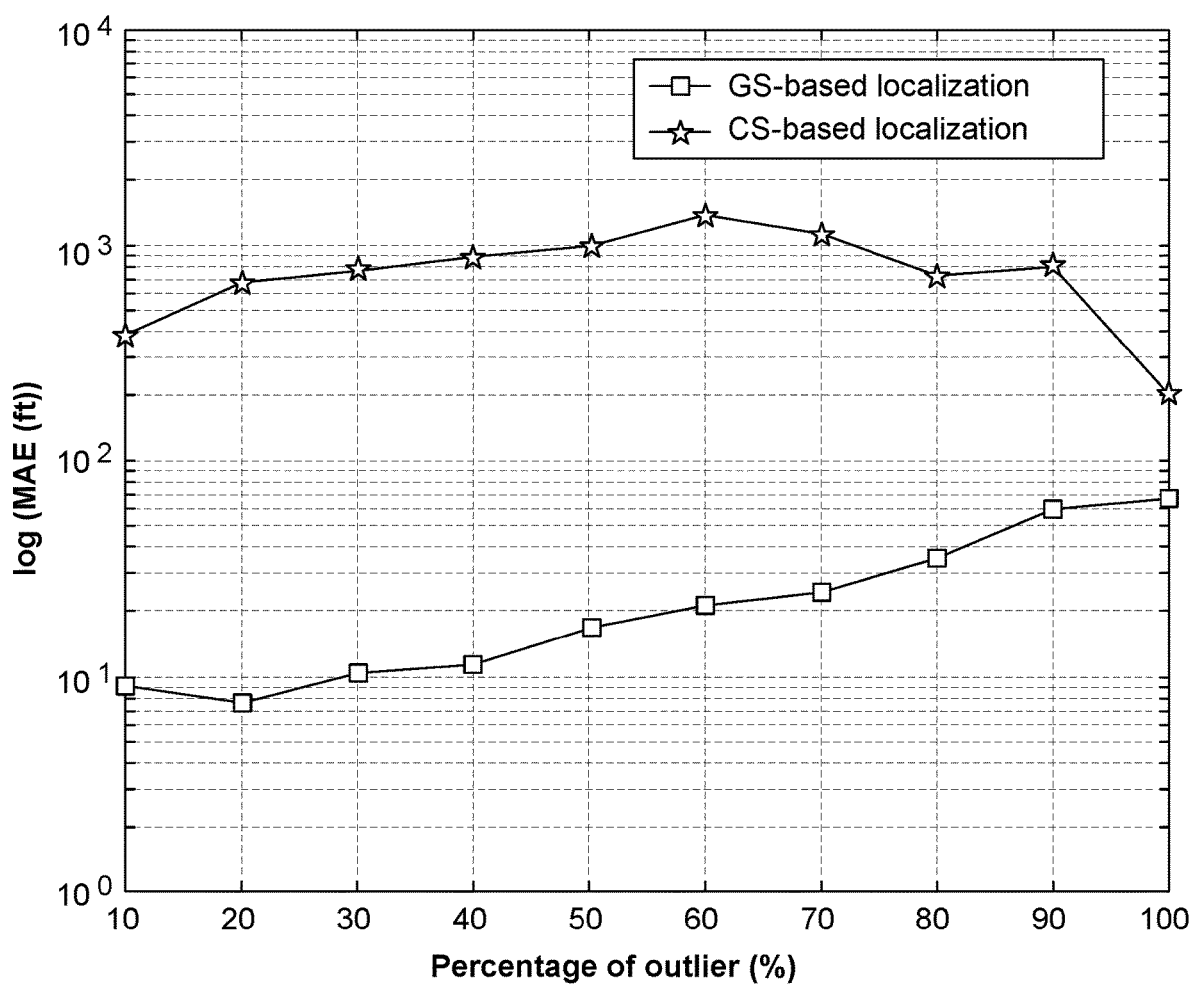
FIG. 13 is a graph of MAE for MGS-based and CS-based localization according to various example embodiments.
Figure 14:
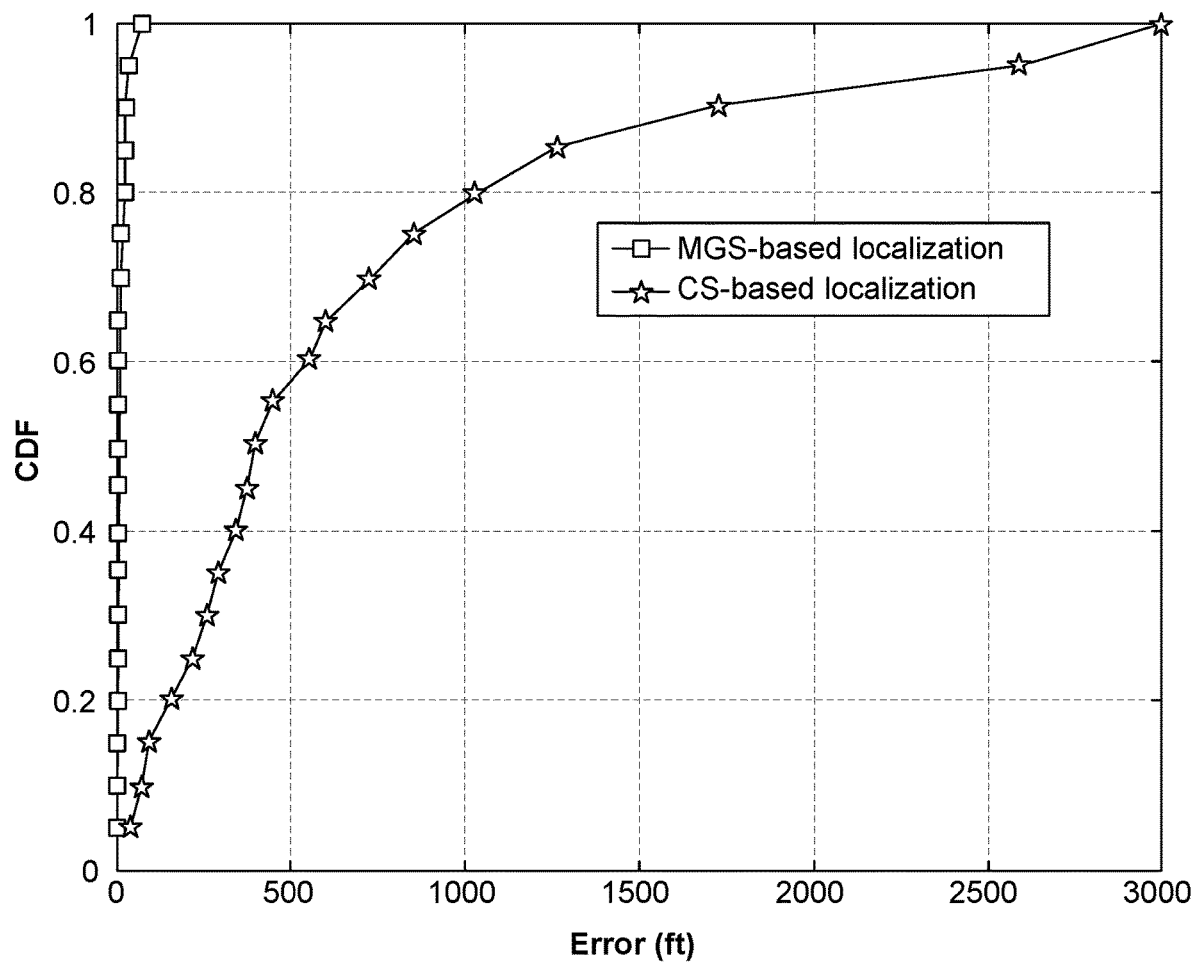
FIG. 14 is a graph illustrating the cumulative distribution localization error for MGS-based and CS-based localization according to various example embodiments.
Figure 15:
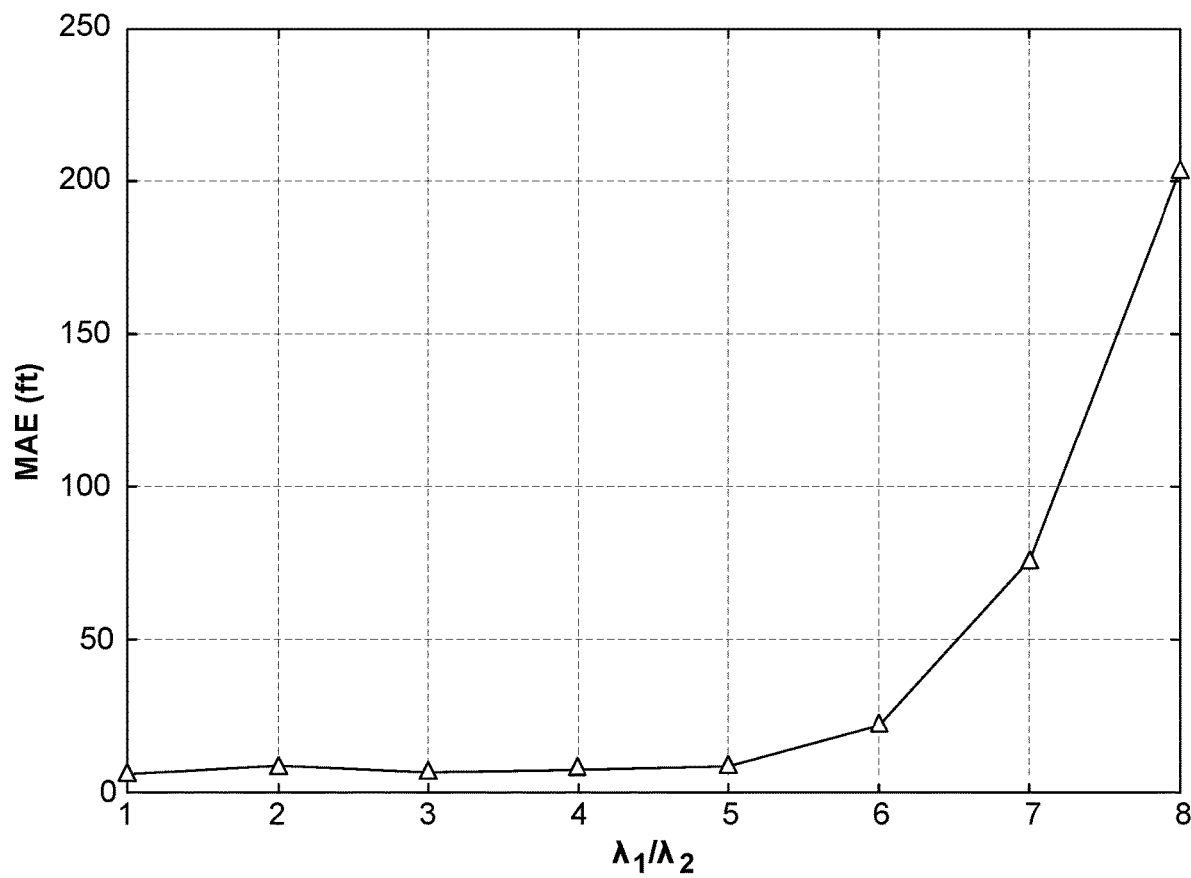
FIG. 15 is a graph illustrating the localization error of the GS-based approach according to various example embodiments.
Figure 16:
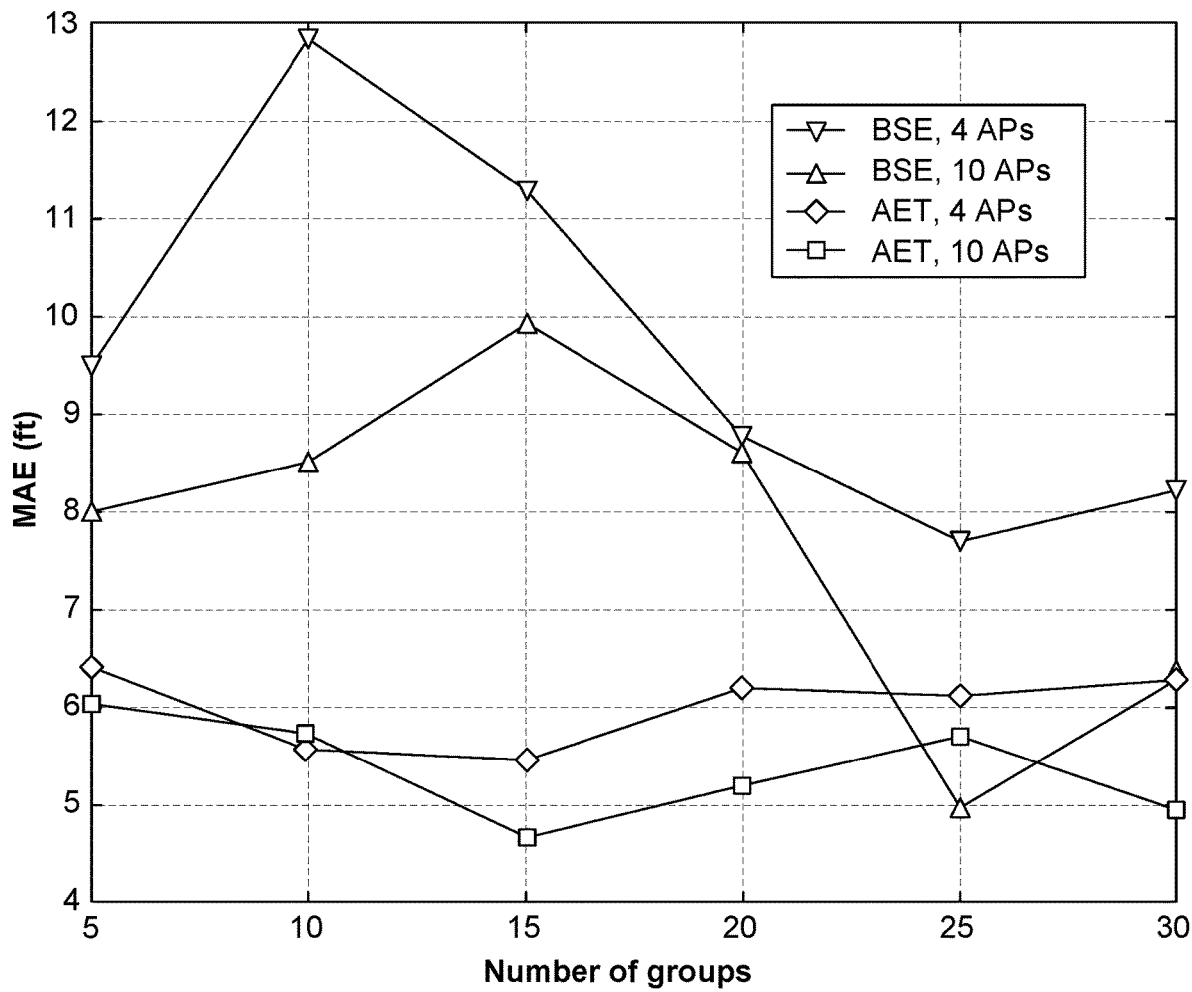
FIG. 16 is a graph illustrating the average localization error according to various example embodiments.
Figure 17:
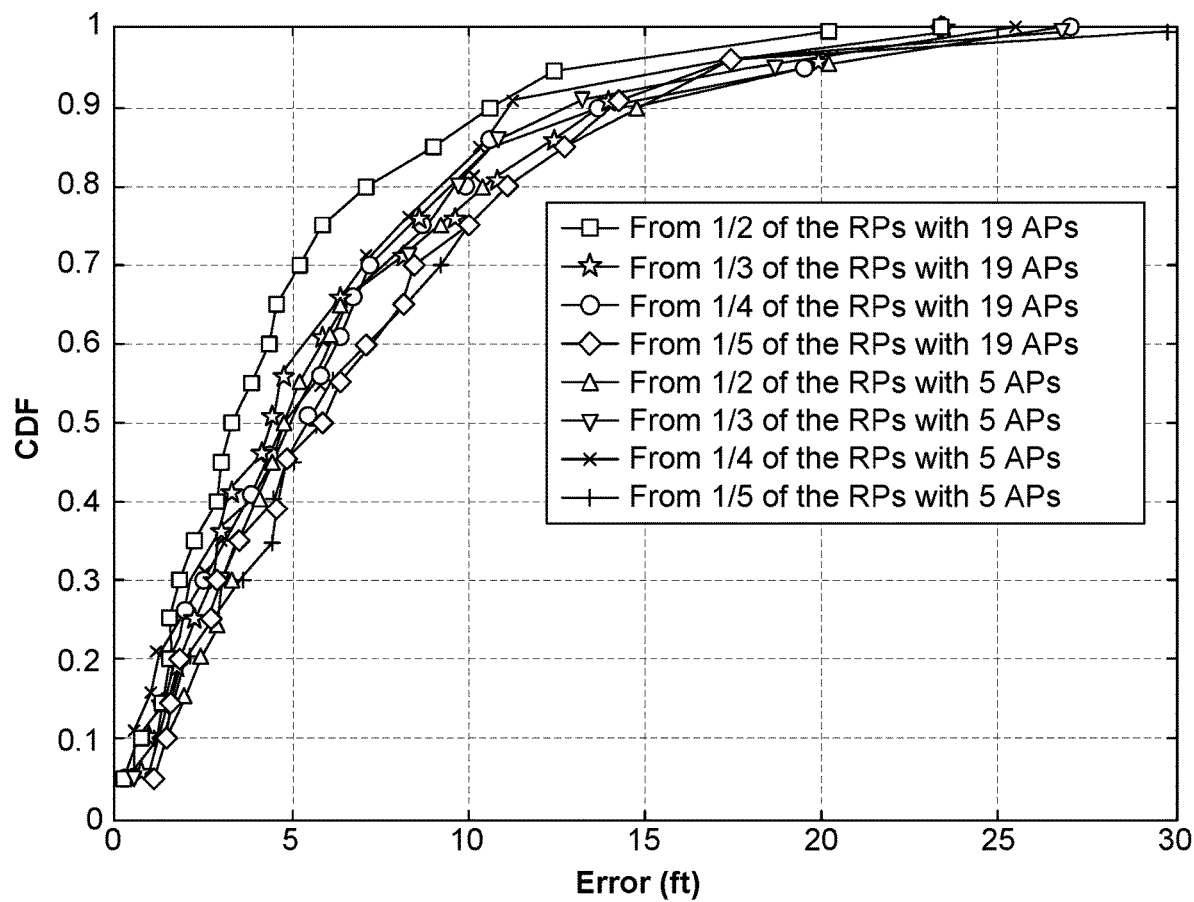
FIG. 17 is a graph illustrating the cumulative distribution of the various localization errors according to various example embodiments.
Figure 18:
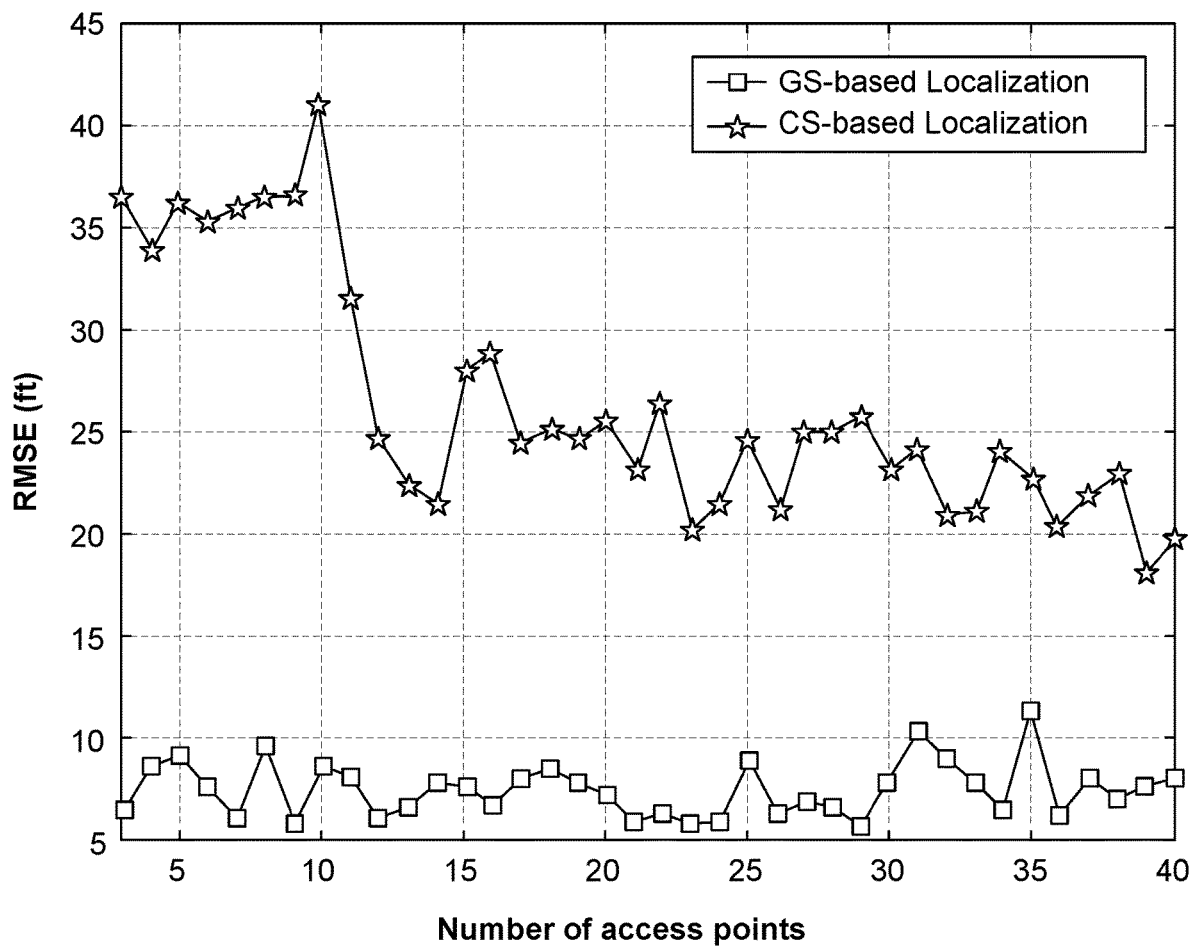
FIG. 18 is a graph illustrating the average RMSE of estimated positions for CS-based and GS-based localization according to various example embodiments.
Figure 19:
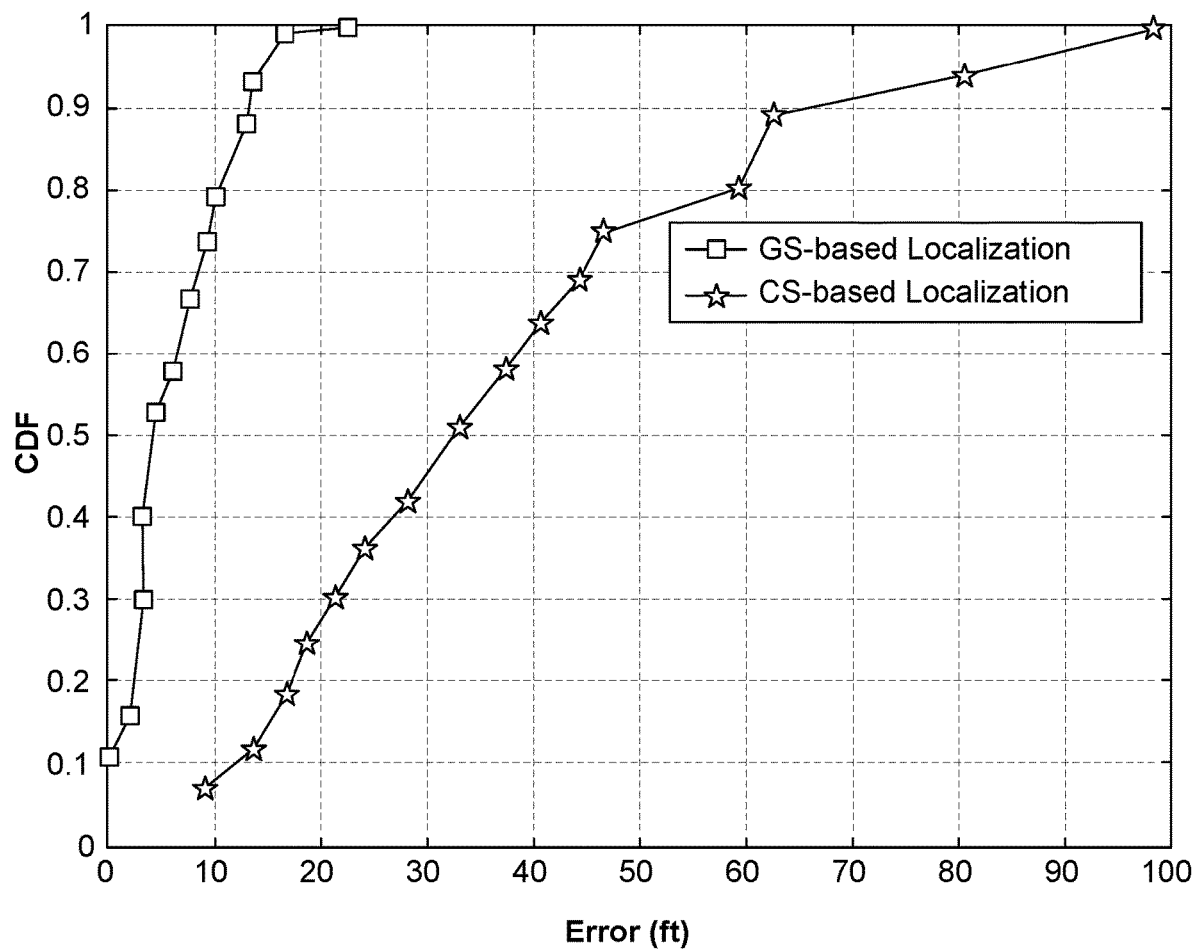
FIG. 19 is a graph illustrating the cumulative position error for GS-based localization compared to CS-based localization according to various example embodiments.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present invention" refers to any one of the embodiments of the invention described herein and any equivalents. Furthermore, reference to various feature(s) of the "present invention" is not to suggest that all embodiments must include the referenced feature(s).

Among embodiments, some aspects of the present invention are implemented by a computer program executed by one or more processors, as described and illustrated. As would be apparent to one having ordinary skill in the art, the present invention may be implemented, at least in part, by computer-readable instructions in various forms, and the present invention is not intended to be limiting to a particular set or sequence of instructions executed by the processor.

The embodiments described herein are not limited in application to the details set forth in the following description or illustrated in the drawings. The invention is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

In some embodiments a computing device can include a transceiver that can receive and transmit electro-magnetic signals. As an example, the transceiver can send and receive electro-magnetic signals to access points (AP) on a network. The computing device can identify an electro-magnetic signal map for an area. In some embodiments, the computing device can generate an electro-magnetic signal map by measuring location-dependent measurements characterizing the signals from all available access points from a variety of reference points (RP).

To determine a location of the computing device, a computing device can determine access points within the area of the computing device. As an example, a computing device can determine a set of location-dependent measurements characterizing the signals received from at least one of a plurality of access points; generate a comparison of the set of measurements to the radio map based at least in part on a multi-objective optimization of at least two objective functions which may be subject to constraints; and determine a position vector which conveys information about the location of the computing device based at least in part on the comparison. These computations may be performed by potentially different computing devices, at potentially different locations.

It should be understood that the present invention may be employed in all installations with static deployment of basestations (wireless modems, routers, access-points, etc), including cellular, WLAN and other networks.

It should be understood that the present invention may employ location-dependent measurements that include, but are not limited to, received signal strength measurements and multipath model parameters. Different types of location-dependent measurements may be used alone or in combination. Fingerprinting can use any location-dependent measurements which characterize received signals. Signal fingerprinting refers to an evidence (received signal features called fingerprints in analogy to real fingerprints) that are used to differentiate different locations based on a difference of a propagation path which impact received signal characteristics.

In some aspects, the present invention uses optimization of multi-objective cost functions of a position vector and some other variables, to achieve several objectives at the same time. In other words, several objectives are optimized jointly. Position vector directly or indirectly conveys information about the device location or its location likelihood. One objective may relate to a minimization of a distance between received fingerprints and entries of the offline surveyed radio map, another objective may relate to various sparsity assumptions and/or requirements of the position vector model, a third objective may relate to the variable that isolate the impact of potential faulty/spoofed measurements, and so on. The multi-objective optimization in finding location, where the environmental, measurement and other factors are also included in the optimization of the cost function. The interpolation of measurements for reduced surveying effort may be part of the optimization. LASSO may be a particular case of such multi-objective function optimization.

In some aspects the invention may involve clustering. Clustering refers to selecting a reduced subset of possible locations, which are then used for finer location estimation. I.e. reducing the search of locations to a certain reduced area.

In one embodiment a computing device can include a transceiver that can receive and transmit radio signals. As an example, the transceiver can send and receive WiFi signals to access points (AP) on a wireless local area network (WLAN). The computing device can identify a radio map for an area. In some embodiments, the computing device can generate a radio map by measuring received signal strengths (RSS) from all available access points from a variety of reference points (RP).

To determine a location of the computing device, a computing device can determine access points within the area of the computing device. As an example, the computing device can identify all access points from which the computing device receives a signal above a predefined threshold. The computing device can generate a set of received signal strengths from the determined access points within the area of the user. As an example, the computing device can determine a received signal strength for each of the access points to generate the set of received signal strengths.

The computing device can compare the set of received signal strengths to the radio map to determine a location. The radio map can include a plurality of sets of received signal strengths. Each of the sets can be from a different reference point in the area. The computing device can compare the set of received signal strengths to the previously recorded signal strengths at each of the reference points to determine the location relative to the reference point locations. The radio map can be generated using radio map interpolation.

A positioning algorithm can be used for the comparison to determine the location. The algorithm can include one or more of a LASSO algorithm, a GLMNET algorithm, a GS algorithm, a modified CS algorithm, a modified LASSO algorithm, a modified GLMNET algorithm, a modified GS algorithm, or another algorithm. Some algorithms can be modified to also provide for outlier detection.

Offline Clustering

The localization approach can be used on handheld devices with low computational capabilities. Since the computational complexity of minimization problems increases polynomially with the size of the problem, searching for the devices location in the entire RP set is impractical. Hence, the localization approach can include confining the searching area to a subset of the RPs. In some embodiments, the radio map is a database of fingerprints without any regularity in the order of the RPs. Groups of RPs with similar features can be identified and the online measurement can be compared against the representative features of each sub cluster. The clustering can be performed on the fingerprints in the offline phase such that the localization scheme deals with a categorized radio map. The offline clustering can be applied at each orientation independently because the radio map is recorded in four orientations.

In one offline RP clustering approach, each RP can be considered as a node of a graph. Let the set of all RPs be the nodes V of graph G with the edges E that connect the nodes: G=(V; E). A weight can be assigned to each edge based on the similarity of the nodes connected by the edge (the similarity will be defined shortly). The weighted graph can be clustered such that the nodes with the most similarities are categorized in a cluster. For each cluster, a CH can be defined that represents the most features of that cluster. A node can be a member or follower (FL) of more than one cluster, and thus, called a neighbor node.

The weighted connection (edge) between two nodes can be regulated by the similarity measure between the nodes. This similarity can be based on the fact that spatially close RPs receive similar readings from the same set of APs. The similarity metric that reveals this feature is the Hamming distance between the two corresponding RPs. Consider $p_j$ and $p_{j'}$ are two RPs whose similarity needs to be determined. The hamming distance between these two nodes can be defined as:

$$H^o(p_j, p_{j'}) = d_H(I_j^o, I_{j'}^o) = \sum_{i=1}^{L} |I_j^{i,o} - I_{j'}^{i,o}| \tag{1}$$

$$\forall j, j' \in \{1, 2, \ldots, N\}, j \neq j', \forall o \in O$$

where $d_H$ is the Hamming distance between two reliability indicator vectors $I_j^o, I_{j'}^o$ which specifically denote the set of reliable APs for $p_j$ and $p_{j'}$. An AP can be considered reliable for $p_j$ if its RSS fingerprints are above a threshold "most of the time." To formalize this notion, first define the set of time slots that the surveyed radio map is above a threshold $\gamma$:

$$\mathcal{T}_j^{i,o} = \{m \in \{1, \ldots, M\} | r_j^{i,o}(t_m) \geq \gamma\}.$$

$$\forall i=1, \ldots, L, \forall j=1, \ldots, N, \forall o \in \mathcal{O} \tag{2}$$

The AP index $I_j^{i,o}$, defined next, denotes the APs whose readings satisfy (2) for a threshold amount of the time during recording the radio map fingerprints. As an example, the threshold amount can be set to 90%.

$$I_j^{i,o} = \begin{cases} 1 & |\mathcal{T}_j^{i,o}| \geq 0.9M \\ 0 & \text{otherwise} \end{cases} \tag{3}$$

$$i = 1, \ldots, L|, o \in O$$

where $|:|$ denotes the cardinality. Next, let $L_j^o$ be the set of APs that satisfy (3):

$$\mathcal{L}_j^o = \{i \in \{1, \ldots, L\} | I_j^{i,o} = 1\}. \tag{4}$$

The similarity $s^o(j; j')$ between RPs $p_j$ and $p_{j'}$ can be defined as:

$$s^o(j, j') = \begin{cases} \dfrac{1}{H^o(p_j, p_{j'})} & H^o(p_j, p_{j'}) \neq 0 \\ \Lambda & \text{otherwise} \end{cases} \tag{5}$$

$$\forall j, j' = 1, \ldots, N, j \neq j' \quad \forall o \in O$$

which is proportional to the inverse of Hamming distance between two different RPs, and $\Lambda$ can be a sufficiently large number. Since there can be four orientations at each RP, the reliability of a typical AP can be evaluated at each orientation individually. As such, an AP may be reliable only in some orientations of an RP. This similarity can be the weight for each edge connecting the corresponding RPs in the weighted graph G. The trust on an RP can include the stability of the fingerprint readings from the APs through the fingerprinting time. Hence, the variance of readings can be computed for all RPs as:

$$\Delta_j^{i,o} = \frac{1}{M-1} \sum_{n=1}^{M} (r_j^{i,o}(t_m) - \psi_j^{i,o})^2 \tag{6}$$

$$\forall i = 1, \ldots, L, \forall j = 1, \ldots, N, \forall o \in O.$$

The variance of $p_j$ can be the average of variances in the set of APs that obey (3), i.e. $L_j^o$:

$$\Delta_j^o = \frac{1}{|\mathcal{L}_j^o|} \sum_{i \in \mathcal{L}_j^o} \Delta_j^{i,o} \tag{7}$$

$$\forall j = 1, \ldots, N, \forall o \in O$$

The variance for all RPs is organized in a matrix as:

$$\Delta^o = [\Delta_1^o, \ldots, \Delta_N^o] \forall o \in \mathcal{O}. \tag{8}$$

The pseudo-code of our clustering method is provided in Algorithm 1.

| Algorithm 1 Offline Clustering |
| --- |
| 1:  for each direction o ∈ 𝒪 do |
| 2:    for all j, j' ∈ {1, . . . , N} do |
| 3:      compute H° ($p_j$,$p_{j'}$) |
| 4:    end for |
| 5:    for all RPs $p_j$ do |
| 6:      compute $\Delta_j^o$ |
| 7:    end for |
| 8:    CH candidates $\mathcal{B}^o = \{1, \ldots, N\}$ |
| 9:    k = 0; |
| 10:   while $\mathcal{B}^o \neq \emptyset$ do |
| 11:     select one node k from $\mathcal{B}^o$ |
| 12:     define $p_k$ as CH° (k) |
| 13:     $\mathcal{FL}^o$ (k) = {j ≠ k | s° (j, CH°(k)) ≥ η} |
| 14:     $\mathcal{C}^o$ (k) = CH° (k) ∪ $\mathcal{FL}^o$ (k) |
| 15:     $\mathcal{B}^o = \mathcal{B}^o \mathcal{C}^o$ (k) |
| 16:   end while |
| 17:   K = $\mathcal{C}^o$ (k)| |
| 18:   for k = 1, . . . , K do |
| 19:     CH°(k) = $\arg\min_{j \in \mathcal{C}^o(k)} \Delta_j^o$ |
| 20:   end for |
| 21: end for |

The criteria for node $p_{j'}$ to be in the cluster of CH°(k) is the similarity between the two nodes can be greater than a predefined value as:

$$j \in CH^o(k) \text{ if } s^o(j, CH^o(k)) \geq \eta$$

$$\forall k=1, \ldots, K \forall o \in \mathcal{O}. \tag{9}$$

where CH°={CH°(1); : : : ; CH°(K)} is the set of all CHs for orientation o∈𝒪. Since the above criterion for each node can be satisfied for more than one cluster, each node can have a table of CHs it belongs to. So, a node might be FL to more than one CH and can then be considered as a boundary node between the two clusters that it belongs to. Once all cluster members are defined, a representativity test can be conducted within each cluster to select the best node as the representative node of that cluster, CH (see lines 17-19 in Algorithm 1). This can lead to switching the CH of that cluster. This test can measure the suitability of the CH to represent the characteristics of its followers. The cluster, $C^o(k)$, is the set comprising of the cluster head, $CH^o(k)$ and its followers, $\mathcal{FL}^o(k)$ $$C^o(k) = \{CH^o(k)\} \cup \mathcal{FL}^o(k). \tag{10}$$

A node can be selected as the CH when it has the least variance of fingerprints amongst all the cluster members $$CH^o(k) = \{p_j | \Delta_j^o = \min\{\Delta_l^o\}, l = 1, \ldots, |C^o(k)|\}$$

$$\forall k = 1, \ldots, K \forall o \in \mathcal{O}. \tag{11}$$

The offline clustering can define a localization trustability metric which can both evaluate the similarity between a member with its CH and the self-reading trustability of that cluster.

Online Region of Interest (ROI) Selection

Solving the optimization algorithms can be the most computationally intensive part. An ROI can be defined as the most probable region on which the user exists. Selecting the ROI can be based on a comparison between the reliability vectors of the online measurements and the radio map. After the user reads the online measurement y, an indicator vector $I_y^o = \{I_y^{1,o}, \ldots, I_y^{L,o}\}$ is specifically defined to denote the set of reliable APs. An AP is considered reliable if its online RSS values is above a predetermined threshold:

$$I_y^o = \{I_y^{1,o}, \ldots, I_y^{L,o}\}. \tag{12}$$

This reliability vector can define the most trustable APs in online measurements that we can engage in computations. For comparing the online measurement vector, y, with radio map, $\psi^o$, the Hamming distance between the online measurement reliability and CH reliability is defined as $$H_{CH(k)}^o(I_y^o, I_{CH(k)}^o) = \sum_{i=1}^{L} |I_y^{i,o} - I_{CH(k)}^{i,o}| \tag{13}$$

$$k = 1, \ldots, K, o \in O.$$

At each orientation, the CH with the minimum distance can be chosen and the corresponding cluster can be included in the modified radio map, $\tilde{\Psi}$. If the cluster with the minimum distance has points common with other clusters, then the neighbor cluster RPs can also be included. The modified radio map, may contain the fingerprints for one RP but in different orientations. The set of selected RPs in the ROI is denoted as:

$$\tilde{\mathcal{P}} \subset \mathcal{P}, |\tilde{\mathcal{P}}| = N \leq N \tag{14}$$

The Pseudo-code of the ROI selection method is provided in Algorithm 2.

---

Algorithm 2
ROI Selection

1:      compute $I_y$
2:      $\tilde{\Psi} = [\ ]$

---

-continued

Algorithm 2
ROI Selection

3:      for each direction $o \in \mathcal{O}$ do
4:          compute $H_{CH(k)}^o$ for $k = 1, \ldots, K$
5:          find k' s.t. $H_{CH(k')}^o = \min_k \{H_{CH(k)}^o\}$
6:          $\mathcal{K} = \{k = 1, \ldots, K \mid \mathcal{C}^o(k') \cap \mathcal{C}^o(k) \neq \emptyset\}$
7:          $\tilde{\Psi}^o = \{\psi_j^o | j \in \mathcal{C}^o(k') \text{ and } j \in \mathcal{C}^o(k) \ \forall \ k \in \mathcal{K}'\}$
8:          $\tilde{\Psi} = [\tilde{\Psi}, \tilde{\Psi}^o]$
9:      end for

---

MATLAB notation is used for matrix concatenation.

Localization Scheme

Estimating the user's location using fingerprinting data on a discrete grid of RPs whenever the user reads a RSS observation in online phase can be a problem in WLAN positioning. In one embodiment, a function can be used to map the radio map in conjunction with the online measurements to a unique subset of $\hat{\theta} = f(R; y)$. Although sparse recovery minimization can render sparse vectors, the reconstructed position vector can be likely to contain erroneous nonzero indices counting on less probable RPs. Also, the similarity between the online measurements and radio map can be of great importance. So, the residuals $r = y - \Phi \tilde{\Psi} \theta$ can be small. Considering the conventional CS WLAN positioning, the problem can be modified if the optimization algorithm also suppresses the error between the online response variable and predictor vectors. Hence, sparse recovery algorithms can be used that include the $l_1$-norm of the location vector and $l_2$-norm of the residuals simultaneously. The positioning convex optimization problem can be reformulated as:

$$\hat{\theta} = \text{argmin}\left[\frac{1}{|\tilde{\mathcal{L}}|}\|y - H\theta\|_2^2 + \lambda\|\theta\|_1\right] \tag{15}$$

where $H = \Phi \tilde{\Psi}$ and $\lambda \geq 0$ is a tuning parameter. This problem is also known as $l_1$-penalized least squares, LASSO, which incorporates feature and model selection into the optimization. The parameter $\lambda$ can be a regularization parameter that needs to be adjusted properly. The first component can look for coefficients that minimize the residuals, and the residuals can become a sparse vector through soft thresholding on the second term. The LASSO uses only the RPs with the most similar features thus simplifying the model automatically. Once the radio map fingerprints are recorded in four orientations, the coarse localization method can render a modified radio map whose columns may include readings from the same AP in different orientations.

If the propagation environment is similar in different orientations, the fingerprints in the modified radio map, $\tilde{\Psi}$, may have similarities, leading to correlated predictors. LASSO can be shown to be more indifferent to these correlated predictors. Consider there are correlated predictors in the modified radio map. If the user is exactly in an RP, the online measurement is supposed to be very similar to the fingerprints of that RP and the modified radio map may contain some of the orientations of that point. Another possible case is when the user is between two RPs with similar environmental features. In both cases the location estimation problem is expected to assign higher coefficients to the points with correlated fingerprints. Hence, the correlated predictors should be allowed to jointly borrow strength from each other.

We propose another convex optimization problem which incorporates the above features:

$$\hat{\theta} = \operatorname{argmin}\left[\frac{1}{|\mathcal{L}|}\|y - H\theta\|_2^2 + P_\alpha\right] \quad (16)$$

$$P_\alpha = \lambda((1-\alpha)\|\theta\|_2^2 + \alpha\|\theta\|_1))$$

where $\lambda \geq 0$ is a complexity parameter and $0 \leq \alpha \leq 1$ is a compromise between Ridge regression and LASSO. Ridge regression promoted to the shrinkage of the coefficients of correlated radio map columns towards each other and is expressed by the $\|\theta\|_2^2$ objective. Hence, we take advantage of the correlation between the radio map readings. If $\alpha=0$, the above formulation amounts to the Ridge Regression. As $\alpha$ increases from 0 to 1 for a given $\lambda$, the sparsity of the solution increases monotonically from 0 to the sparsity of the LASSO solution. So, this problem jointly considers the correlated predictors and finds a sparse solution for the user's pose. This problem can be referred to as GLMNET.

CS can work for noiseless measurements, which may not be practical for WLAN fingerprinting localization as the measurements can contain errors. Also, the CS can rely on orthogonality properties of H to minimize any correlation between the RSS readings while basically utilize correlations to find a more suitable sparse solution. The computational complexity of the optimization problem can grow with the number of predictors (size of radio map) and dimension of vector $\theta$. Therefore, the coarse localization scheme can reduce the size of the area that the optimization problems needs to seek for the solution and hence reduces the computational time for solving the problem. This can allow these procedures to be executed on resource-limited devices.

If online measurements differ substantially from the radio map fingerprints, as the radio map becomes less reliable through the time, or the mobile user is not located exactly at one RP, the solution to (15) or (16) may not be exactly a 1-sparse vector and may contain several significant nonzero coefficients. Hence, a post-processing step after obtaining the estimated coefficients is needed. We choose the dominant coefficients in $\hat{\theta}$ that are greater than a threshold, and take the weighted average of the corresponding RP positions. Let $\mathcal{J}_\beta$ denote the indices of the $\hat{\theta}$ whose values are above a certain threshold $\beta$ as:

$$\mathcal{J}_\beta = \{v \in \{1, \ldots, V\} | \theta(v) \geq \beta\} \quad (17)$$

where V is the number of columns of $\tilde{\Psi}$. Let $\widetilde{\mathcal{P}}_\beta$ be the set of RPs $\tilde{p}_v$ corresponding to $\hat{\theta}(v) \geq \beta$ and allow repetition of elements in $\widetilde{\mathcal{P}}_\beta$ if there is more than one element in $\widetilde{\mathcal{P}}_\beta$ corresponding to $\tilde{p}_v$. The location of the mobile user is computed as the centroid of the convex hull generated by the RPs in $\widetilde{\mathcal{P}}_\beta$:

$$\hat{p} = (\hat{x}, \hat{y}) = \frac{1}{\sum_{v \in \mathcal{J}_\beta} \hat{\theta}(v)} \sum_{v \in \mathcal{J}_\beta} \hat{\theta}(v) \cdot \tilde{p}_v \quad (18)$$

where $\tilde{p}_v = (\tilde{x}_v, \tilde{y}_v) \in \widetilde{\mathcal{P}}_\beta$.

Group Sparsity-Based Localization

According to one embodiment, a GS-based WLAN fingerprinting localization approach can include, in the online phase, the following steps: 1) RP grouping, 2) AP selection, and 3) localization through group sparse regression. The first step entails computing the similarity between the online measurement and each RP fingerprint via an AP coverage vector. This similarity is the Hamming distance between the most available APs in the radio map. The most available APs are defined as those whose readings are above a specific threshold in most of the fingerprinting time. These similarities can be used to group the RPs. These groups can participate in localization through corresponding weights which are proportional to the inverse of the average group Hamming distance.

In the second step, the number of APs engaged in localization can be reduced through an AP selection method based on either the strongest set of APs, which provide enlarged network coverage most of the time, or the Fisher Criterion. The latter can be very reliable as an AP selection method because the fingerprinting history of the AP can be taken into account.

The third step is the user location estimation, which can be performed through Group-Sparsity (GS)-based regression. This model reflects the relation between the RSS fingerprints, online measurements, user's location, and noise, which models the components that cannot be explicitly defined. The user location can be estimated through the GS-based minimization which addresses the previously mentioned challenges and includes a multi-objective optimization problem. The optimization chooses the RP fingerprints that minimize the difference between the radio map and online measurement, gives the opportunity to all RPs to engage in localization, and provides a sparse user's location. These objectives participate in the minimization problem through their corresponding tuning parameters.

In comparison to the CS-based approach, the GS-based approach has the following advantages: 1) there is no need for coarse localization as the two-step procedure of coarse localization followed by fine localization is not necessarily optimal, 2) the GS-based approach utilizes all RPs in a single step localization, which does not suffer from the issue of potential error in coarse localization, 3) there is no need for preprocessing of the radio map (e.g., orthogonalization of the regression matrix), and 4) the GS-based approach is naturally tailored to noisy measurements, as the residuals are minimized instead of attempting to exactly match the online measurement to a fingerprint.

The user's location can be defined as a sparse vector whose single entry equal to 1 corresponds to the RP that is closest to the user. The CS WLAN localization can use a preprocessing step for online coarse localization, in order to reduce the complexity of searching over all available RPs. However, there is no guarantee that the cluster within which the solution is searched is the best cluster, especially when the clusters are disjoint. To address this problem, the GS-based approach can utilize all the clusters, each with a different share. The group sparsity-based localization can use a sparse user's position vector, which can be recovered by jointly searching all clusters:

$$\hat{\theta} = \operatorname*{argmin}_{\theta}\left[\frac{1}{2}\|y - \Phi\Psi\theta\|_2^2 + \lambda_1\|\theta\|_1 + \lambda_2\sum_{k=1}^{K} w_k\|\theta_k\|_2\right] \quad (19)$$

where $\theta_k$ is the set of RPs in group k and $w_k$ is their corresponding weights, and $y = \phi_y$ is the AP selected online measurements. The possible impact of the online fingerprint noise and outliers can be reduced by minimizing the residuals in the linear equation system and finding the best user's position. In addition, a sparse solution can be searched over all possible RPs so that only a small subset of them are selected. The last term can provide the sparsity over the clusters so that the recovered vector nonzero elements concentrates in groups with higher weights. This term can provide for coarse localization. Sparse Group Lasso (SGL) can be applied in the context of WLAN positioning. In some embodiments, customized solvers can be used.

Typical localization schemes can use coarse localization preprocessing to reduce the size of the problem to search over a smaller region of area. However, if a wrong subset of RPs is selected, the localization error can become very large. Therefore, one advantage of the proposed GS-based localization approach is that the coarse localization scheme is embedded in the fine localization formulation.

Localization and Outlier Detection

Despite the computational efficiency of sparsity-based approaches, indoor WLAN fingerprinting-based positioning systems can still face challenges. The WLAN fingerprints can be affected by the shadowing and multipath effects in complex indoor environments that impair the estimation accuracy. APs' fingerprints are also prone to other problems because the WLAN infrastructure might not be designed for positioning purposes. Modern APs can adapt their transmitting power according to the serving traffic. If the traffic load during the online positioning is different than that of fingerprinting, the APs readings can be quite different. In addition, APs can be vulnerable to adversary attacks which may impersonate, jam, or corrupt the data by attenuating and amplifying the APs RSS readings.

Data measurements for an area may indicate that APs' readings may not be available due to transient effects in either APs or the receiver's Network Interfaces (NI). Likewise, APs that were available during fingerprinting may not be available in the online phase, and vice-versa. These previously mentioned phenomena can seriously challenge assumptions relied upon to calculate position and make calculations less practical.

All these deficiencies can be modeled as outliers. Algorithms are discussed for positioning in the presence of outliers. Outliers can occur in both the offline and online phases. However, in some embodiments, an assumption can be made that preventative measures, including fingerprinting over a long period as well as validation and attack detection can take place on the offline RSS fingerprints.

An outlier can occur when the online measurement from an AP is significantly different from any fingerprint in the area. The existing AP selection schemes select the APs based on the AP performance during the fingerprinting period. However, if an AP provides highly different readings in online positioning phase, the online measurements and the radio map fingerprints may have a large deviation.

Outliers are generally not detected by AP selection methods as they are mainly focused on selecting APs for the best differentiability between RPs. If AP readings contain outliers, penalizing $l_1$-norm of location vector alone does not guarantee outlier rejection and positioning suffers dramatically from large localization errors. Outliers can be integrated in a sparsity-based localization model as:

$$y = \Phi\Psi\theta + \kappa + \epsilon$$

where $\kappa$ is a vector indicating the outliers and is sparse because the number of APs that may contain outliers is small. Hence, $\kappa$ can be jointly estimated with the user location vector using an $l_1$-norm regularization. The modified Group-Sparsity (MGS)-based minimization of (4) can be represented as:

$$(\hat{\theta}, \hat{\kappa}) = \underset{\theta,\kappa}{\mathrm{argmin}} \left[ \frac{1}{2} \|y - H\theta - \kappa\|_2^2 + \lambda_1 \|\theta\|_1 + P_\alpha \right] \quad (21)$$

$$P_\alpha = \lambda_2 \sum_{k=1}^{K} w_k \|\theta_k\|_2 + \lambda_3 \|\kappa\|_1.$$

The outlier vector $\kappa$ can enable the optimization (21) to discard the outliers and find the user's location with the cleaned measurements. In essence, $\kappa$ absorbs significant deviations from fingerprints. Optimization (20) amounts to a second order cone program, which can be efficiently solved.

Formulation of LASSO and GLMNET for Localization and Outlier Detection

WLAN fingerprints can be easily affected by the shadowing and multipath effects in complex indoor environments that impair the estimation accuracy. APs' fingerprints are also prone to other problems as the WLAN infrastructure is not essentially established for positioning purposes. Modern APs adapt their transmitting power according to the serving traffic. If the traffic load during the online positioning is different than that of fingerprinting, the APs readings may be quite different. In addition, APs are vulnerable to adversary attacks which may impersonate, jam, or corrupt the data by attenuating and amplifying the APs RSS readings. Our real data measurements also indicate that APs' readings may not be available due to transient effects in either APs or the receiver's Network Interfaces (NI). Likewise, APs that were available during fingerprinting may not be available in the online phase, and vice-versa. These previously mentioned phenomena seriously challenge the assumptions in the literature and make them less practical. All these deficiencies are modeled as outliers. Presented are algorithms for positioning in the presence of outliers.

Outliers may occur in both the offline and online phases, however, we assume that preventative measures, including fingerprinting over a long period as well as validation and attack detection have taken place on the offline RSS fingerprints. Hence, we discuss outlier detection in the online phase.

An outlier occurs when the online measurement from an AP is significantly different from any fingerprint in the area. The existing AP selection schemes select the APs based on the AP performance during the fingerprinting period. However, if an AP provides highly different readings in online positioning phase, the online measurements and the radio map fingerprints may have a large deviation.

The outlier detection scheme herein described relies on explicit modeling of the outliers present in the online measurements. Specifically, with denoting the outlier vector, the online measurements adhere to the following model:

$$y = \Phi\psi\theta + \kappa + E.$$

The advantage of the previous model is that the outlier vector $\kappa$ will be sparse as long as the number of corrupted APs is small, and can therefore be estimated jointly with the position indicator vector $\theta$ via $l1$-minimization. The premise of explicitly modeling the outliers for robust regression in general statistical settings has been previously analyzed in [81] and [82]. In what follows, the CS, LASSO, and GLM- NET approaches are modified so that the outlier vector $\kappa$ can be estimated alongside the user's position vector $\theta$.

The modified CS (M-CS) approach minimizes the weighted combination of the $\ell 1$ norms of $\theta$ and $\kappa$.

$$(\hat\theta, \hat\kappa) = \operatorname{argmin}[\|\theta\|_{\{1\}} + \mu\|\kappa\|_{\{1\}}]$$

s.t. $y = \phi\psi\theta + \kappa$

The modified LASSO (M-LASSO) approach minimizes the squared residuals, in addition to the $\ell 1$ norms of the sparse vectors:

$$(\hat\theta, \hat\kappa) = \operatorname{argmin}\left[\frac{1}{|\mathcal{L}|}\|y - H\theta - \kappa\|_2^2 + \lambda\|\theta\|_1 + \mu\|\kappa\|_1\right] \quad (27)$$

where $\mu$ is a tuning parameter.

Finally, the modified GLMNET (M-GLMNET) amounts to the following optimization problem:

$$(\hat\theta, \hat\kappa_j) = \operatorname{argmin}\left[\frac{1}{|\mathcal{L}|}\|y - H\theta - \kappa_j\|_2^2 + P_\alpha\right]$$

$$P_\alpha = \lambda((1-\alpha)\|\theta\|_2^2 + \alpha\|\theta\|_1) + \mu\|\kappa_j\|_1).$$

In the previous joint localization and outlier detection formulations, the outlier vector, $\kappa$, enables the optimization algorithm to discard the outliers in the online measurement vector. Both user's location and the outlier indicator vector have the weights $\lambda$ and $\mu$, respectively.

Radio Map Construction

For indoor WLAN fingerprinting localization, the area can be divided into a set of RPs $\mathcal{P} = \{p_j = (x_j, y_j), j=1, \ldots, N\}$, where $p_j$ defines the RP Cartesian coordinates in $R^2$. At each RP, RSS fingerprints can be recorded at time instants $t_m$; $m=1; \ldots; M$ with magnitudes $r^i_j(t_1); \ldots; r^i_j(t_M)$, where $i$ indicates the AP index from the set of APs $L = \{AP^1; \ldots; AP^L\}$. The RSS fingerprints from all APs at position $p_j$ and at time $t_m$ are organized in a vector $r_j(t_m) = [r^1_j(t_m); \ldots; r^L_j(t_m)]^T$. The radio map at instant $t_m$ is the matrix consisting of the vectors $r_j(t_m)$; $j=1; \ldots; N$, as columns. The time-averaged radio map, $\psi_{L \times N}$, is defined as:

$$\Psi = \begin{pmatrix} \psi^1_1 & \cdots & \psi^1_N \\ \vdots & \ddots & \vdots \\ \psi^L_1 & \cdots & \psi^L_N \end{pmatrix} \quad (22)$$

where $$\psi^i_j = \frac{1}{M}\sum_{m=1}^{M} r^i_j(t_m)$$

and $\psi^i = [\psi^i_1, \ldots, \psi^i_N]$. The columns of radio map represent the average fingerprint readings at each RP from all APs. Since not all APs provide readings at each RP, the corresponding RSS value can be set to a small value, $-95$ dBm, to imply its unavailability.

Figure 20:
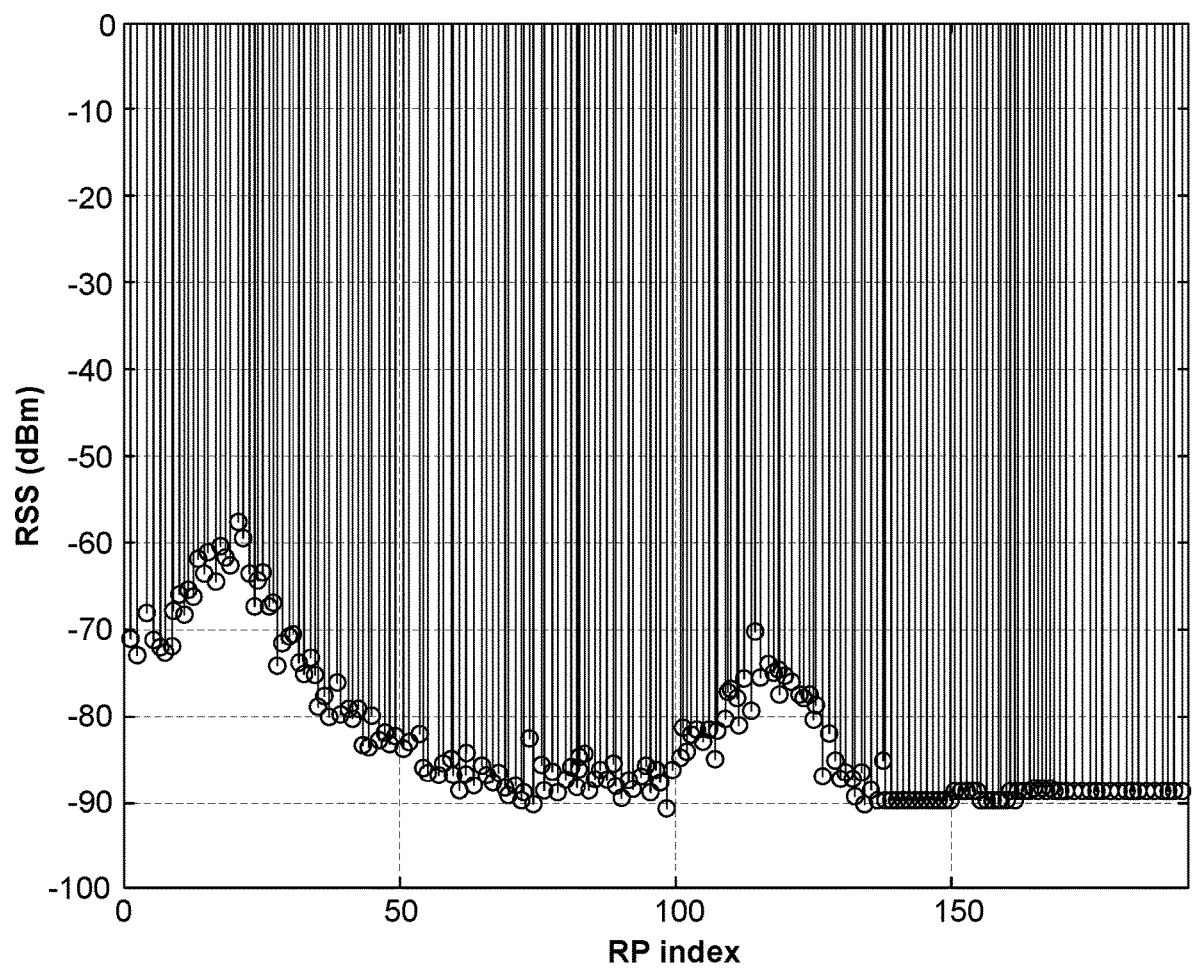
FIG. 20 is a RSS profile for a single AP through the whole area over 192 RPs. The smoothness of the profile shows a great potential for interpolation

With reference to FIG. 20, shown is a schematic block diagram of the computing environment according to an embodiment of the present disclosure. The computing environment includes one or more computing devices 2000. Each computing device 2000 includes at least one processor circuit, for example, having a processor 2010 and a memory 2020, both of which are coupled to a local interface 2002. To this end, each computing device 2000 may comprise, for example, at least one server computer or like device. The local interface 2002 may comprise, for example, a data bus with an accompanying address/control bus or other bus structure as can be appreciated.

Radio Map Interpolation

Figure 21:
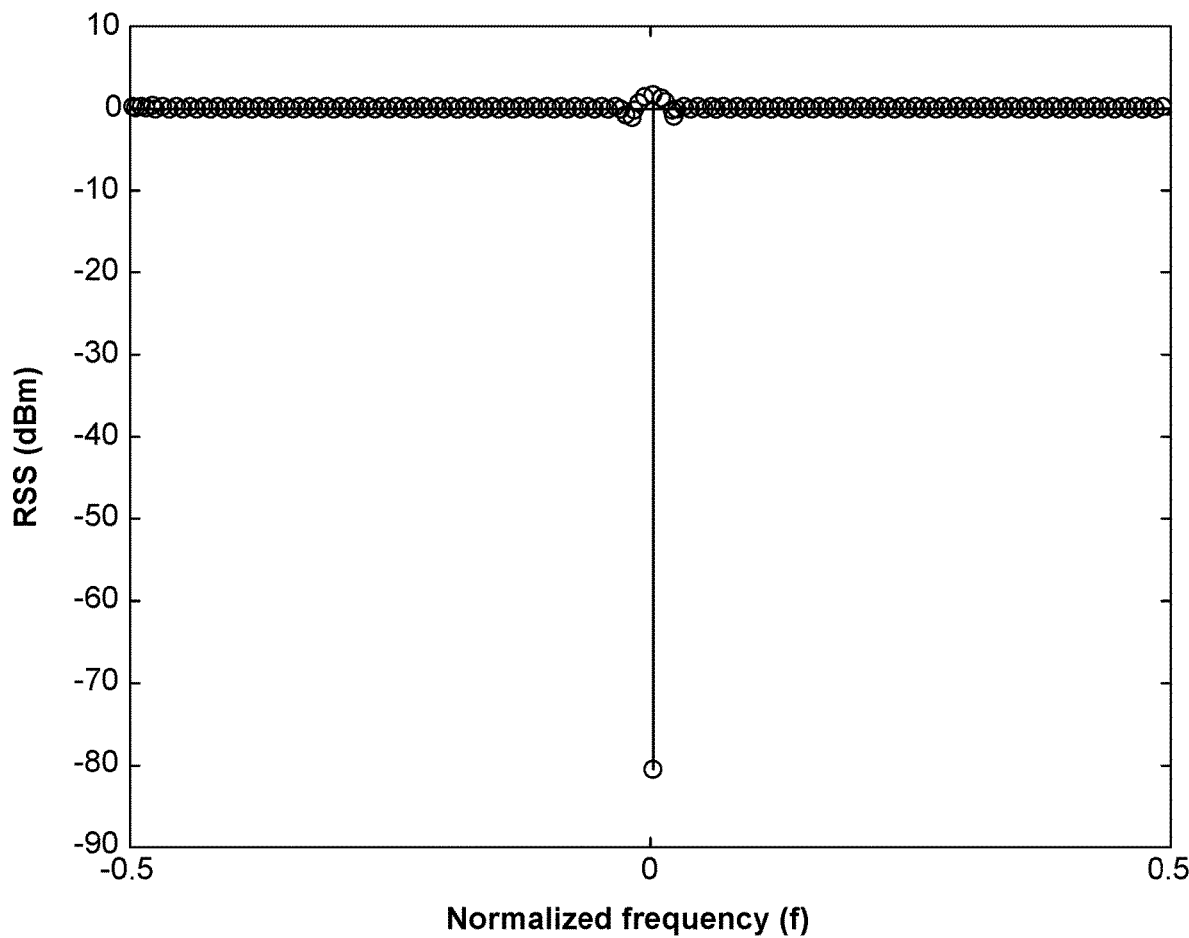
FIG. 21 is a frequency representation of the RSS fingerprints for an AP according to various example embodiments. The great sparse profile shows the potential for RSS interpolation using the sparse recover algorithm.

The RSS fingerprints can be interpolated at some RPs if we measure the radio map at other RPs. In other words, the radio map fingerprints can be collected at coarser granularity and the RSS fingerprints can be estimated at a denser granularity through interpolating the radio map between RPs. FIG. 20 shows the RSS profile for a single AP over 192 RPs. This shows the smoothness of the profile and a suitable potential for interpolating the magnitudes of some RPs from their adjacent RPs. FIG. 21 also represents the frequency representation of the RSS profile. This representation shows the very sparse feature of fingerprints which can be utilized for sparse reconstruction (interpolation).

The representation of $\psi^i$ is sparse which means most of the frequency components are zero and our empirical evidence also confirms it. This observation helps us reconstruct the radio map in the subsequent discussions. Then, consider a matrix that defines the relation between all RPs and the ones that we have taken the fingerprints over. To this end, we define a matrix $A_{V \times N}$ whose rows are 1-sparse vectors $a_i = [0, \ldots, 1, \ldots, 0]$ denoting the index of the RP that is measured during radio map fingerprinting, and V is the total number of these RPs. In essence, A selects the RPs in which we record actual fingerprints.

The model for the offline radio map interpolation for AP i can be represented as $$b^i = A\psi^i = AF^{-1}\psi^i_f, i=1, \ldots L.$$

Equation (18) is an under-determined system of equations because $V < N$. However, since $\psi i$ is sparse, a unique solution exists for it. To find the unique solution for (18), we propose a special case of the group sparse recovery formulation as $$\hat\psi^i_f = \operatorname*{argmin}_{\psi^i_f}\left[\frac{1}{2}\|b^i - AF^{-1}\psi^i_f\|_2^2 + \lambda_1\|\psi^i_f\|_1\right]$$

which has the form of the group sparse recovery (4) with $\lambda 2 = 0$. This reformulated minimization problem is known as Least Absolute Shrinkage and Selection Operator (LASSO). The above formulation minimizes the error between the measured RSS fingerprints and the interpolated fingerprints, while the second term provokes sparsity of the RSS fingerprints in the Fourier domain.

The previous optimization is solved for all APs. The reconstructed radio map rows are computed as $$\hat\psi^i = F^{-1}\hat\psi^i_f$$

where $\hat\psi i$ is the reconstructed radio map for AP i. Using (19), RSS fingerprints can be measured on a smaller number of RPs, and the radio map is interpolated in between RPs for a finer granularity.

In the interpolation, some RPs are skipped and choosing a selection order for faithful radio map reconstruction is a problem discussed in Appendix. For the rest of this paper, the interpolation will be used on random selection of RPs.

B. Interpolation with Radio Map Outliers

Previously, we discussed the outlier detection for the user's online measurement vector. The outliers may also happen in the offline phase for radio map fingerprints. If the radio map is interpolated in the offline phase and the APs whose RSS fingerprints are recorded contain outliers at specific RPs, the interpolation procedure should also contain an outlier detection scheme. The extension of (18) to include outliers is as follows:

$$b^i = A\psi^i + \mathbf{K}_i = AF^{-1}\psi_f^i + \mathbf{K}_i, i=1,\ldots,L.$$

Based on the previous model, the modified radio map reconstruction scheme which contains the outlier detection component is $$(\hat{\psi}_f^i, \hat{\kappa}_j) = \underset{\psi_f^i, \kappa_j}{\operatorname{argmin}} \left[ \frac{1}{2}\|b^i - AF^{-1}\psi_f^i - \kappa_j\|_2^2 + P_\alpha \right]$$

$$P_\alpha = \lambda_1 \|\psi_f^i\|_1 + \lambda_2 \|\kappa_j\|_1.$$

The above minimization reduces the effect of outlier for AP I by detecting the outlier, while interpolating between RPs with clean measurements.

Figure 22:
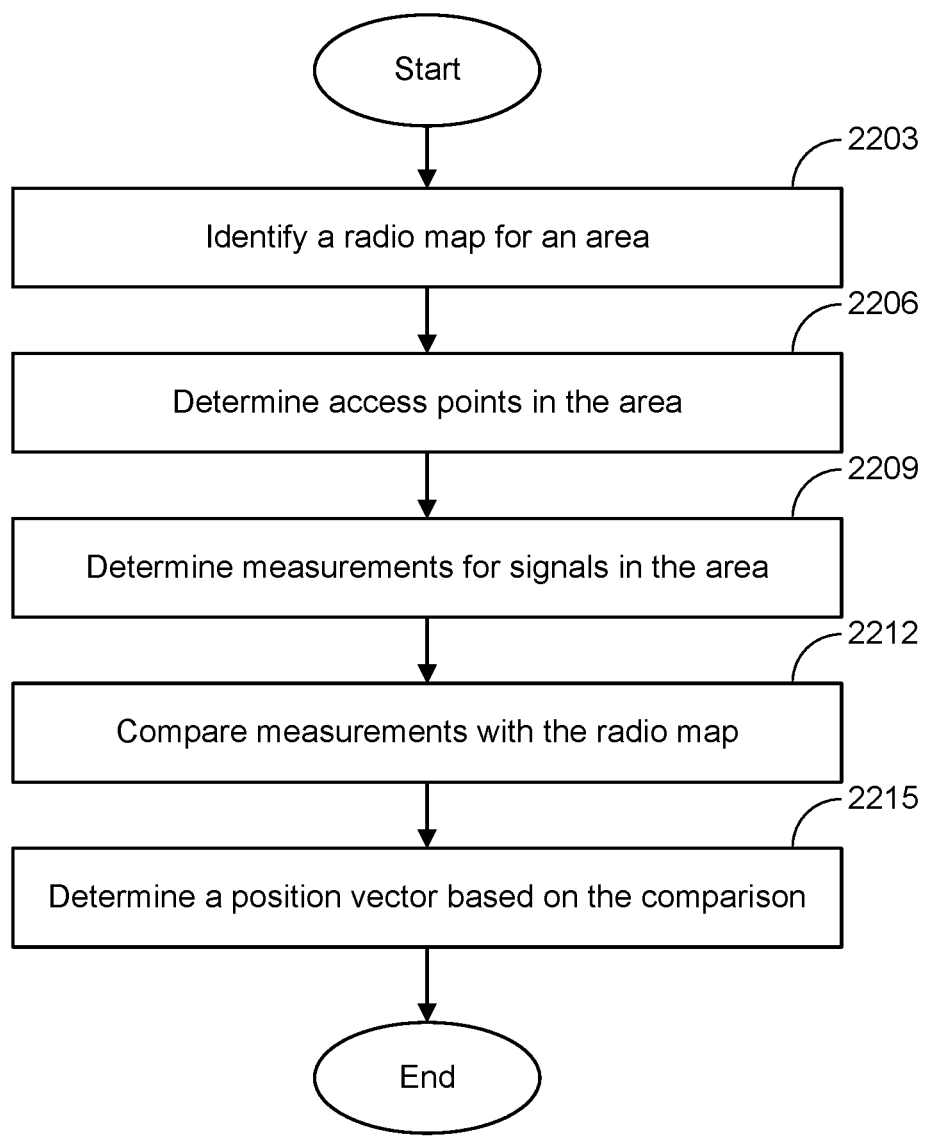
FIG. 22 illustrates an example flowchart of certain functionality implemented by portions of an application executed in a computing device according to various example embodiments.

Referring next to FIG. 22, shown is a flowchart that provides one example of the operation of a portion of the position determination according to various embodiments. It is understood that the flowchart of FIG. 22 provides merely an example of the many different types of functional arrangements that may be employed to implement the operation of the portion of the position determination as described herein. As an alternative, the flowchart of FIG. 22 may be viewed as depicting an example of elements of a method implemented in a computing environment 2300 (FIG. 23) according to one or more embodiments. Measurements can be taken at one or more reference points.

At box 2203, the process involves identifying a radio map for an area. Multiple reference points can be identified to take measurements from. Measurements can be taken from each reference point to each access point. The measurements can be location-dependent based on the reference point and access point corresponding to the measurement. A radio map can be generated based on the measurements. For example, the radio map can include the received signal strengths (RSS) from all available access points from a variety of reference points (RP). The radio map can be generated based on a coarser radio map. For example, a computing device can determine points in a radio map by interpolating additional points using the coarser radio map. The interpolation can be performed using optimization techniques as discussed herein. The coarser radio map can be obtained using fingerprint collection associated with landmarks or other types of known locations.

The radio map can be identified by selecting a radio map corresponding to a current location. For example, a GPS location for a computing device can be compared to a set of GPS locations for a given area to determine an appropriate radio map for the area. The radio map can be identified by selecting a radio map based on a current network connection, such as, for example, a wired network connection, a wireless network connection, properties associated with a network connection, or network connection property.

At box 2206, the process involves determining access points in the area. The access points can be determined based on data stored in a data base. The location of each access point can be compiled when installed in the area or recorded later. In one embodiment, each access point can determine a current location and send the location to a computing device. The locations of the access points can be compiled in the data store.

At box 2209, the process involves determining measurements for signals in the area. A computing device can determine a measurement for a signal from one or more access points. As an example, the computing device can measure a wireless signal strength to each access point in range. The wireless signal strength can be a received signal strength or other measured property.

At box 2212, the process involves comparing measurements with the radio map. The measurements in box 2209 can be compared to the radio map identified in box 2203. As an example, objective functions can be used to compare the radio map and the measurements. A multi-objective optimization can be performed on two or more objective functions. The objective functions may be subject to constraints. The objective functions can depend on the radio map, the measurements, the position vector, and other factors. The objective functions can be parameterized. In one example, parameters of the objective functions can depend on the radio map and the measurements.

At box 2215, the process involves determining a position vector based on the comparison. The position vector can convey information about a location of the computing device. The position vector can be determined based on the comparison from box 2212. The position vector can be determined based on a position algorithm. The position algorithm can be modified to perform outlier detection. The outlier detection can be performed using optimization techniques. The position algorithm can include one or more of a LASSO algorithm, a GLMNET algorithm, a GS algorithm, a modified CS algorithm, a modified LASSO algorithm, a modified GLMNET algorithm, and a modified GS algorithm.

Figure 23:
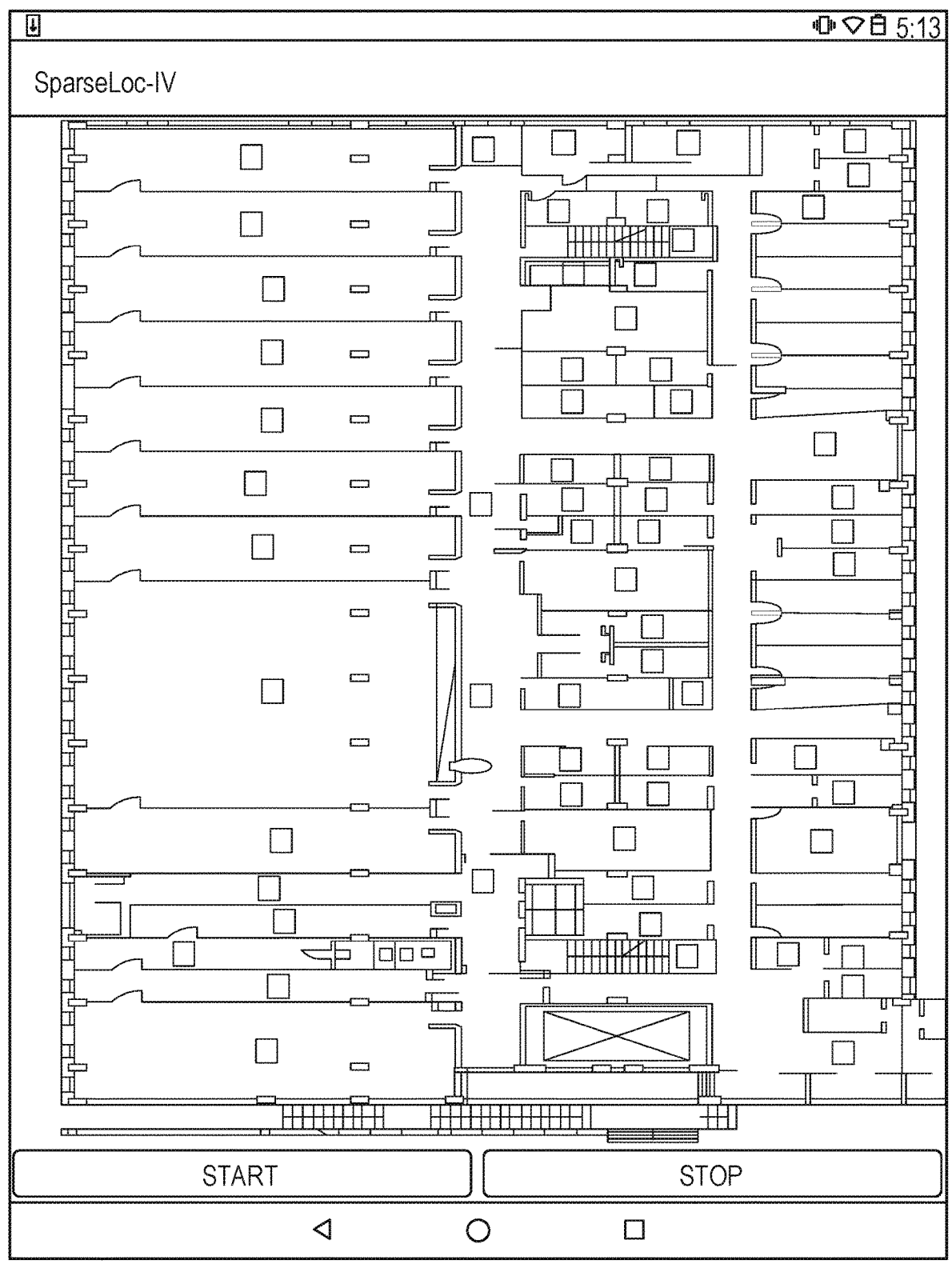
FIG. 23 is an overview of a user interface of an application according to various embodiments.
Figure 24:
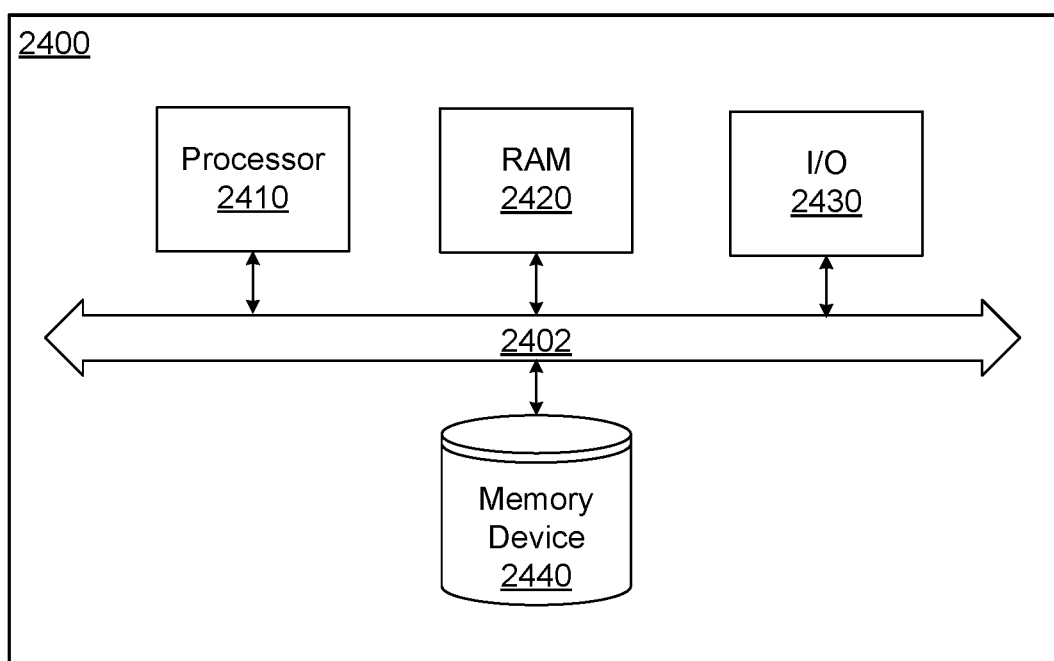
FIG. 24 is a schematic block diagram that illustrates an example computing environment employed according to various example embodiments.

With reference to FIG. 23, shown is an overview of a user interface of an application. The user interface can be rendered on a display. With reference to FIG. 24, shown is a computing device 2400. Stored in the memory 2420 are both data and several components that are executable by the processor 2410. In particular, stored in the memory 2420 and executable by the processor 2410 are various applications. Also stored in the memory 2420 or 2440 may be a data store and other data. In addition, an operating system may be stored in the memory 2420 and executable by the processor 2410.

It is understood that there may be other applications that are stored in the memory 2420 and are executable by the processor 2410 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 2420 and are executable by the processor 2410. In this respect, the term "executable" means a program file that is in a form that can ultimately be run by the processor 2410. Examples of executable programs may be, for example, a compiled program that can be translated into machine code in a format that can be loaded into a random access portion of the memory 2420 and run by the processor 2410, source code that may be expressed in proper format such as object code that is capable of being loaded into a random access portion of the memory 2420 and executed by the processor 2410, or source code that may be interpreted by another executable program to generate instructions in a random access portion of the memory 2420 to be executed by the processor 2410, etc. An executable program may be stored in any portion or component of the memory 2420 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 2420 is defined herein as including both volatile and nonvolatile memory and data storage components. Volatile components are those that do not retain data values upon loss of power. Nonvolatile components are those that retain data upon a loss of power. Thus, the memory 2420 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 2410 may represent multiple processors 2410 and/or multiple processor cores and the memory 2420 may represent multiple memories 2420 that operate in parallel processing circuits, respectively. In such a case, the local interface 2402 may be an appropriate network that facilitates communication between any two of the multiple processors 2410, between any processor 2410 and any of the memories 2420, or between any two of the memories 2420, etc. The local interface 2402 may comprise additional systems designed to coordinate this communication, including, for example, performing load balancing. The processor 2410 may be of electrical or of some other available construction.

Although the localization functionality, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The localization functionality discussed herein can be implemented as portions of an application executed in the computing device 2400. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 2410 in a computer system or other system. The machine code may be converted from the source code, etc. If embodied in hardware, each block may represent a circuit or a number of interconnected circuits to implement the specified logical function(s).

Also, any logic or application described herein that can be embodied in software or is comprised of software or code can be embodied in any non-transitory computer-readable medium for use by or in connection with an instruction execution system such as, for example, a processor 2410 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 2400 or in multiple computing devices in the same computing environment. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A method comprising:
    identifying a radio map for an area;
    determining a plurality of access points within the area;
    determining, via a computing device, a set of location-dependent measurements characterizing signals received from at least one of the plurality of access points;
    determining a position vector corresponding to a location of the computing device based at least in part on the set of location-dependent measurements according to the formula $$\hat{\theta} = \underset{\theta}{\operatorname{argmin}} \left[ \frac{1}{2} \|y - \Phi\Psi\theta\|_2^2 + \lambda_1 \|\theta\|_1 + \lambda_2 \sum_{k=1}^{K} w_k \|\theta_k\|_2 \right],$$

where $\theta_k$ is the set of reference points in group k and $w_k$ is their corresponding weights, and $y = \phi_y$ is the set of location-dependent measurements for the access points.

2. The method of claim 1, further comprising:
    determining a plurality of sets of location-dependent measurements from individual ones of a plurality of reference points, each of the plurality of sets of location-dependent measurements comprising a location-dependent measurement for individual ones of a respective subset of the plurality of access points; and
    generating the radio map based at least in part on the plurality of sets of location-dependent measurements.

3. The method of claim 1, wherein the radio map is generated using a coarser radio map through interpolation.

4. The method in claim 1, wherein a coarser radio map is obtained through fingerprint collection associated with known locations.

5. The method of claim 1, wherein a multi-objective optimization is applied for radio map design.

6. The method of claim 1, wherein each objective function depends on at least one of the radio map, the measurements, the position vector.

7. The method of claim 1, wherein the position vector is determined by additional processing of results of the multi-objective optimization.

8. The method of claim 1, wherein the objective functions are parameterized.

9. The method of claim 8, wherein parameters of the objective functions depend at least in part on the radio map and the measurements.

10. The method in claim 1, wherein the location-dependent measurements are received signal strengths.

11. The method of claim 1, wherein determining the position vector is based at least in part on at least one of: a LASSO algorithm, a GLMNET algorithm, a GS algorithm, a modified CS algorithm, a modified LASSO algorithm, a modified GLMNET algorithm, and a modified GS algorithm.

12. The method of claim 1, wherein detecting at least one outlier based at least in part on a positioning algorithm.

13. The method in claim 12, wherein the outlier detection is performed in part based on optimization techniques.

14. A system comprising:
    a data store comprising at least one radio map;
    at least one computing device in communication with the data store, the at least one computing device being configured to at least:
        identify a radio map for an area from the at least one radio map in the data store;
        determine a plurality of access points within the area;
        determine a set of location-dependent measurements characterizing signals received from at least one of the plurality of access points;
    determine a position vector corresponding to a location of the computing device based at least in part on the set of location-dependent measurements according to the formula $$\hat{\theta} = \underset{\theta}{\operatorname{argmin}} \left[ \frac{1}{2} \|y - \Phi\Psi\theta\|_2^2 + \lambda_1 \|\theta\|_1 + \lambda_2 \sum_{k=1}^{K} w_k \|\theta_k\|_2 \right],$$

where $\theta_k$ is the set of reference points in group k and $w_k$ is their corresponding weights, and $y = \phi_y$ is the set of location-dependent measurements for the access points.

15. The system of claim 14, wherein the at least one computing device is further configured to at least:
    determine a plurality of sets of location-dependent measurements from individual ones of a plurality of reference points, each of the plurality of sets of location-dependent measurements comprising a location-dependent measurement for individual ones of a respective subset of the plurality of access points; and
    generate the radio map based at least in part on the plurality of sets of location-dependent measurements.

16. The system of claim 14, wherein the radio map is generated using radio map interpolation.

17. The system of claim 14, wherein determining the position vector is based at least in part on a positioning algorithm, the positioning algorithm being modified to perform outlier detection.

18. The system in claim 14, wherein the location-dependent measurements are received signal strengths.

19. A method comprising:
    identifying a radio map for an area;
    determining a plurality of access points within the area;
    determining, via a computing device, a set of location-dependent measurements characterizing signals received from at least one of a plurality of access points;
    generating a finer radio map based at least in part on a multi-objective optimization;
    determining a position vector corresponding to a location of the computing device within the finer radio map based at least in part on the set of location-dependent measurements according to the formula $$\hat{\theta} = \underset{\theta}{\operatorname{argmin}} \left[ \frac{1}{2} \|y - \Phi\Psi\theta\|_2^2 + \lambda_1 \|\theta\|_1 + \lambda_2 \sum_{k=1}^{K} w_k \|\theta_k\|_2 \right],$$

where $\theta_k$ is the set of reference points in group k and $w_k$ is their corresponding weights, and $y = \phi_y$ is the set of location-dependent measurements for the access points.

20. The method of claim 19 further comprising:
determining a plurality of sets of received signal strengths from individual ones of a plurality of reference points, each of the plurality of sets of received signal strength comprising a received signal strength for individual ones of a respective subset of the plurality of access points; and
generating the radio map based at least in part on the plurality of sets of received signal strengths.

\* \* \* \* \*